US011549214B2

(12) United States Patent
Wagler et al.

(10) Patent No.: US 11,549,214 B2
(45) Date of Patent: Jan. 10, 2023

(54) PROCESSES, METHODS, AND SYSTEMS FOR CHEMO-MECHANICAL CELLULAR EXPLOSION AND SOLID AND LIQUID PRODUCTS MADE BY THE SAME

(71) Applicant: IFG Technologies, LLC, Coeur d'Alene, ID (US)

(72) Inventors: Timothy Wagler, West Lafayette, IN (US); Chester Gunn, Doerun, GA (US)

(73) Assignee: IFG Technologies, LLC, Coeur d'Alene, ID (US)

( * ) Notice: Subject to any disclaimer, the term of this patent is extended or adjusted under 35 U.S.C. 154(b) by 29 days.

(21) Appl. No.: 16/990,977

(22) Filed: Aug. 11, 2020

(65) Prior Publication Data

US 2020/0390108 A1    Dec. 17, 2020

Related U.S. Application Data

(63) Continuation of application No. PCT/US2019/057943, filed on Oct. 24, 2019.

(Continued)

(51) Int. Cl.
   *D21B 1/36*        (2006.01)
   *D21B 1/02*        (2006.01)
   (Continued)

(52) U.S. Cl.
   CPC .............. *D21B 1/36* (2013.01); *D21B 1/02* (2013.01); *D21B 1/021* (2013.01); *D21B 1/026* (2013.01);

(Continued)

(58) Field of Classification Search
   CPC ... D21C 1/02; D21C 1/04; D21B 1/36; D21B 1/021
   See application file for complete search history.

(56) References Cited

U.S. PATENT DOCUMENTS 1,922,313 A * 8/1933 Mason ..................... D21B 1/36
                                                99/323.4
3,585,924 A * 6/1971 Nolan .................. B01D 29/902
                                                100/95

(Continued)

FOREIGN PATENT DOCUMENTS

AU        2015246115 A1    11/2015
CN         1642409 A        7/2005

(Continued)

OTHER PUBLICATIONS

PCT/US2019/057943—International Search Report and Written Opinion dated Jan. 16, 2020, 15 pages.

(Continued)

*Primary Examiner* — Anthony Calandra
(74) *Attorney, Agent, or Firm* — Troutman Pepper Hamilton Sanders LLP; Dustin B. Weeks

(57) ABSTRACT

Disclosed herein is a process, comprising: combining one or more additives with a feedstock to obtain a first mixture, the feedstock comprising a fibrous material and water, the fibrous material comprising lignin, cellulose, and hemicellulose; and conditioning the first mixture to obtain a liquid product and a dry pulp product. Also disclosed herein are condition processes and machines for use with the same. Also disclosed herein are liquid products, dry pulp products, and fibrous pellets made by the disclosed processes, and methods of using the same.

15 Claims, 8 Drawing Sheets

Related U.S. Application Data

(60) Provisional application No. 62/749,919, filed on Oct. 24, 2018.

(51) Int. Cl.

| | | |
|---|---|---|
| *D21C 9/18* | (2006.01) | |
| *D21H 11/08* | (2006.01) | |
| *D21B 1/06* | (2006.01) | |
| *D21C 1/04* | (2006.01) | |
| *D21C 3/04* | (2006.01) | |
| *D21C 3/22* | (2006.01) | |
| *C05F 5/00* | (2006.01) | |

(52) U.S. Cl.
CPC .............. *D21B 1/06* (2013.01); *D21C 1/04* (2013.01); *D21C 3/04* (2013.01); *D21C 3/22* (2013.01); *D21C 9/18* (2013.01); *D21H 11/08* (2013.01); *C05F 5/002* (2013.01)

(56) References Cited

U.S. PATENT DOCUMENTS

| | | | |
|---|---|---|---|
| 3,661,328 A * | 5/1972 | Leask .................... | D21D 1/303 241/18 |
| 4,144,122 A | 3/1979 | Emanuelsson et al. | |
| 4,214,947 A * | 7/1980 | Berger .................... | D21B 1/12 162/DIG. 2 |
| 5,262,003 A * | 11/1993 | Chupka .................... | D21B 1/32 162/247 |
| 5,328,562 A * | 7/1994 | Rafferty .................. | C08L 97/02 162/247 |
| 5,417,992 A * | 5/1995 | Rizvi ....................... | A21D 8/02 366/85 |
| 7,709,557 B2 | 5/2010 | Medoff et al. | |
| 7,960,325 B2 | 6/2011 | Kluko | |
| 9,643,147 B2 | 5/2017 | van Engelen et al. | |
| 9,783,861 B2 | 10/2017 | Jansen et al. | |
| 2004/0169306 A1 | 9/2004 | Crews et al. | |
| 2008/0105392 A1 * | 5/2008 | Duggirala ............... | D21C 3/00 162/23 |
| 2009/0221814 A1 * | 9/2009 | Pschorn ................... | D21C 1/02 536/128 |
| 2010/0041119 A1 * | 2/2010 | Christensen ............. | C08H 8/00 435/162 |
| 2011/0296748 A1 * | 12/2011 | Harris ..................... | C10L 5/442 44/605 |
| 2012/0118517 A1 * | 5/2012 | Lehoux ..................... | C12P 7/10 210/337 |
| 2012/0125324 A1 * | 5/2012 | Fisk ......................... | D21B 1/16 127/1 |
| 2015/0147796 A1 * | 5/2015 | Bonde ..................... | A23K 10/32 435/165 |
| 2016/0002851 A1 | 1/2016 | Gates et al. | |
| 2016/0076067 A1 | 3/2016 | Cotti Comettini et al. | |
| 2017/0101737 A1 * | 4/2017 | Juhl Føns ............... | C08H 8/00 |
| 2017/0167078 A1 * | 6/2017 | Åkerblom ............... | D21B 1/36 |
| 2018/0237806 A1 | 8/2018 | Retsina et al. | |

FOREIGN PATENT DOCUMENTS

| | | |
|---|---|---|
| CN | 102177293 A | 9/2011 |
| KR | 20150044951 A | 4/2015 |
| WO | 2007/063171 A1 | 6/2007 |
| WO | 2007063171 A1 | 6/2007 |

OTHER PUBLICATIONS

Scott, Tim C. et al., "Pulp Extrusion at Ultra-High Consistencies", TAPPI Proceedings, 1997 Environmental Conference & Exhibit, Book 2, May 5-7, 1997, pp. 739-743, 6 pages.

Feng, Yanhong et al., "Changes in the Microstructure and Components of Eulaliopsis binata Treated by Continuous Screw Extrusion Steam Explosion", BioResources 11(4), 2016, pp. 9455-9466, 12 pages.

International Search Report and Written Opinion for PCT Application No. PCT/US2019/057943 dated Jan. 16, 2020.

International Preliminary Report on Patentability for PCT Application No. PCT/US2019/057943 dated Apr. 27, 2021.

Office Action for Chinese Application No. 201980085756.1 dated Jun. 9, 2022.

* cited by examiner

PROCESSES, METHODS, AND SYSTEMS FOR CHEMO-MECHANICAL CELLULAR EXPLOSION AND SOLID AND LIQUID PRODUCTS MADE BY THE SAME

CROSS-REFERENCE TO RELATED APPLICATIONS

This application is a continuation of PCT Application No: PCT/US2019/057943, filed 24 Oct. 2019, which claims the benefit of U.S. Provisional Patent Application No. 62/749,919, filed 24 Oct. 2018. The entire contents and substance of these applications are incorporated herein by reference in their entirety as if fully set forth below.

STATEMENT REGARDING PRIOR DISCLOSURES BY THE INVENTOR OR A JOINT INVENTOR UNDER 37 C.F.R. 1.77(B)(6)

The present application was previously filed as PCT application No. PCT/US2019/057943. The PCT application was published on 30 Apr. 2020 as PCT Publication No. WO/2020/086900. The subject matter in the PCT application was invented exclusively by the two inventors named in the present application.

FIELD OF THE DISCLOSURE

The present disclosure relates generally to chemo-mechanical conditioning processes. Particularly, embodiments of the present disclosure relate to solid and liquid products made by chemo-mechanical cellular explosion processes, and systems and methods of making and using the same.

BACKGROUND

Processing raw materials into useable and value-added products is a constant area of human innovation that is consistently developing. Wood or other lignocellulosic materials, for example, can be processed into useable and value-added products such as paper, packaging, biofuel, pellets and the like. A current problem with such processes, as with all processes, is high energy inputs and the addition of harsh chemicals required to obtain valuable products. In processing lignocellulosic materials, large amounts of shaft work are required to mill the materials to desirable sizes, and large amounts of added energy (e.g., heat and/or pressure) and chemicals (e.g., strong acids or bases) are necessary to remove excess water content and inhibiting constituents. Additionally, the temperature increase by the added heat can vaporize and/or cause a conversion of organic matter raw materials into harmful volatile organic compounds (VOCs), which are then released into the atmosphere. In some cases, additional energy- and cost-intensive measures must be undertaken to further process the released VOCs and other hazardous waste generated during the processes. Producing useful products in an energy-efficient manner, without hazardous and harsh chemicals, is desirable to expand the design space of a number of industries, such as construction/infrastructure, building, energy, energy production, packaging, lawn/garden products, farming, food production, anti-pollution, and the like. Additionally, preserving the content of the raw organic materials, such as VOCs, nutrients, organic acids, and the like, is desirable to obtain other useful co-products during processing. Such co-products present attractive opportunities to produce value-added products and improve margins of processing.

What is needed, therefore, are processes, methods, and systems for producing solid and liquid products from lignocellulosic (or other) feedstocks in an energy-efficient and clean (i.e., with no harsh chemicals added) manner while emitting no harmful byproducts, such as VOCs. Embodiments of the present disclosure address this need as well as other needs that will become apparent upon reading the description below in conjunction with the drawings.

BRIEF SUMMARY OF THE INVENTION

The present disclosure relates generally to chemo-mechanical conditioning processes. Particularly, embodiments of the present disclosure relate to solid and liquid products made by chemo-mechanical cellular explosion processes, and systems and methods of making and using the same. An exemplary embodiment of the present invention can provide a process, comprising: combining one or more additives with a feedstock to obtain a first mixture, the feedstock comprising a fibrous material and water; and conditioning the first mixture to obtain a liquid product and a dry pulp product.

In any of the embodiments disclosed herein, the fibrous material comprises cellulose.

In any of the embodiments disclosed herein, the fibrous material further comprises lignin and hemicellulose.

In any of the embodiments disclosed herein, the feedstock comprises water in an amount from about 10% to about 90% by weight, based on the total weight of the feedstock.

In any of the embodiments disclosed herein, the dry pulp product comprises water in an amount of about 35% or less by weight, based on the total weight of the dry pulp product.

In any of the embodiments disclosed herein, the liquid product comprises water in an amount of about 50% or greater by weight, based on the total weight of the liquid product.

In any of the embodiments disclosed herein, the conditioning comprises: applying a shear force to the first mixture to increase a pressure of the first mixture; and exploding a plurality of cells of the fibrous material of the first mixture.

In any of the embodiments disclosed herein, the conditioning further comprises: mixing the additive with the fibrous material of the first mixture to form a treated material; removing a first portion of water from the treated material; solubilizing the additive with the first portion of water; and weakening cell walls of the plurality of cells of the fibrous material of the treated material.

In any of the embodiments disclosed herein, the weakening comprises reacting the additive with lignin in the cell walls.

In any of the embodiments disclosed herein, the conditioning further comprises: applying a shear force to the treated material to increase a pressure and a temperature of the treated material; vaporizing a second portion of water in the treated material by fractionating the fibrous material of the treated material; and exposing the treated material to atmospheric pressure to induce the exploding of the plurality of cells of the fibrous material.

In any of the embodiments disclosed herein, the liquid product contains at least 75% of the VOCs present in the feedstock.

In any of the embodiments disclosed herein, the conditioning occurs at a maximum temperature from about 200° F. to about 350° F.

In any of the embodiments disclosed herein, the additive comprises a surfactant.

In any of the embodiments disclosed herein, the additive has a molecular weight from about 30 g/mol to about 10,000,000 g/mol.

In any of the embodiments disclosed herein, the process further comprises pelletizing the dry solids product to form a pellet.

In any of the embodiments disclosed herein, the liquid product comprises one or more bio-stimulant compounds and water.

In any of the embodiments disclosed herein, the one or more bio-stimulant compounds comprise one or more of: minerals, proteins, amino acids, humic acid, fulvic acid, and one or more organic acids.

In any of the embodiments disclosed herein, the minerals comprise one or more of potassium, phosphor, phosphorus, nitrous compounds, calcium, magnesium, sulfur, sulfurous, sodium, iron, manganese, zinc, and copper.

In any of the embodiments disclosed herein, the liquid product further comprises one or more of: cellulose, lignin, and hemicellulose.

An exemplary embodiment of the present invention can provide the dry pulp product made by any of the processes disclosed herein.

An exemplary embodiment of the present invention can provide the liquid product made by any of the processes disclosed herein.

Another embodiment of the present invention can provide a chemo-mechanical cellular explosion process, comprising: mixing one or more additives to a fibrous material, the fibrous material comprising water; removing a first portion of water from the fibrous material; solubilizing the additive with the first portion of water; weakening cell walls of a plurality of cells of the fibrous material; applying a shear force to the fibrous material to increase a pressure and a temperature of the fibrous material; vaporizing a second portion of water in the fibrous material by fractionating the fibrous material; and exposing the fibrous material to atmospheric pressure to induce exploding of the plurality of cells in the fibrous material.

In any of the embodiments disclosed herein, when the fibrous material is mixed with the one or more additives, the fibrous material comprises water in an amount from about 5% to about 90% by weight, based on the total weight of the fibrous material.

In any of the embodiments disclosed herein, when the fibrous material is exposed to atmospheric pressure to induce exploding of the plurality of cells, the fibrous material comprises water in an amount of about 35% or less by weight, based on the total weight of the fibrous material.

In any of the embodiments disclosed herein, the process occurs at a maximum temperature from about 200° F. to about 350° F.

In any of the embodiments disclosed herein, the additive comprises a surfactant.

In any of the embodiments disclosed herein, the additive has a molecular weight from about 30 g/mol to about 10,000,000 g/mol.

An exemplary embodiment of the present invention can provide a fibrous pulp material produced by any of the processes disclosed herein.

An exemplary embodiment of the present invention can provide a liquid produced by any of the processes disclosed herein, the liquid comprising: solid particulates, one or more bio-stimulant compounds, and water.

In any of the embodiments disclosed herein, the one or more bio-stimulant compounds comprise one or more of: minerals, proteins, amino acids, humic acid, fulvic acid, and one or more organic acids.

In any of the embodiments disclosed herein, the one or more organic acids are present in the liquid in an amount from about 0.001% to about 10% by weight, based on the total weight of the liquid.

In any of the embodiments disclosed herein, the water is present in the liquid in an amount from about 50% to about 90% by weight, based on the total weight of the liquid.

In any of the embodiments disclosed herein, the liquid further comprises lignin, wherein the lignin is present in the liquid in an amount from about 0.01% to about 75% by weight, based on the total weight of the liquid.

In any of the embodiments disclosed herein, the minerals comprise one or more of: potassium, phosphorus, nitrous compounds, calcium, magnesium, sulfur, sodium, iron, manganese, zinc, and copper.

In any of the embodiments disclosed herein, the solid particulates have a dry matter weight percent from about 0.0001% to about 50% based on the total weight of the liquid.

An exemplary embodiment of the present disclosure can provide a method of promoting growth in a plant, comprising administering the liquid of any of the processes disclosed herein to the plant.

Another embodiment of the present disclosure can provide a fibrous pellet, comprising: a fibrous material comprising a plurality of exposed cellulose fibers, each of the plurality of exposed cellulose fibers entangled with at least one other exposed cellulose fiber; and water in an amount of about 35% or less, based on the total weight of the fibrous pellet.

In any of the embodiments disclosed herein, the fibrous material further comprises one or more of lignin and hemicellulose.

In any of the embodiments disclosed herein, the plurality of exposed cellulose fibers comprises contorted fibers.

In any of the embodiments disclosed herein, the fibrous pellet has a pellet durability index (PDI) of 75 or greater.

In any of the embodiments disclosed herein, the fibrous material comprises fibers having an average maximum cross-sectional size of about 100 nanometers to about 1000 microns.

In any of the embodiments disclosed herein, the fibrous pellet does not comprise a binder.

In any of the embodiments disclosed herein, the fibrous pellet has a bulk density from about 15 kg/m$^3$ to about 800 kg/m$^3$.

In any of the embodiments disclosed herein, the plurality of exposed cellulose fibers is present in the fibrous pellet in an amount of 2% or greater by weight, based on the total weight of the pellet.

In any of the embodiments disclosed herein, the plurality of exposed cellulose fibers is present in the fibrous pellet in an amount of 5% or greater by weight, based on the total weight of the pellet.

In any of the embodiments disclosed herein, the plurality of exposed cellulose fibers is present in the fibrous pellet in an amount from 5% to 80% by weight, based on the total weight of the pellet.

In any of the embodiments disclosed herein, the plurality of exposed cellulose fibers is present in the fibrous pellet in an amount from 5% to 60% by weight, based on the total weight of the pellet.

In any of the embodiments disclosed herein, the plurality of exposed cellulose fibers is present in the fibrous pellet in an amount from 5% to 50% by weight, based on the total weight of the pellet.

In any of the embodiments disclosed herein, the fibrous material is present in the fibrous pellet in an amount of 99.99% or greater by weight, based on the total weight of the pellet.

Another embodiment of the present disclosure can provide a process for increasing feedstock throughput, the process comprising: mixing one or more additives with a feedstock to obtain a first mixture, the feedstock comprising a fibrous material and water, the fibrous material comprising cellulose; densifying the feedstock to obtain a product; wherein the throughput of the process increases by 1 to 30% relative to the process with no additive.

In any of the embodiments disclosed herein, the water is present in the feedstock in an amount from about 5% to about 30% by weight, based on the total weight of the feedstock.

In any of the embodiments disclosed herein, the fibrous material further comprises lignin.

In any of the embodiments disclosed herein, the feedstock comprises one or more of: grains, grasses, cellulosic materials and lignocellulosic materials, bones, food-industry processing waste, and combinations thereof.

In any of the embodiments disclosed herein, the densifying comprises forming the product into one or more of: pellets, briquettes, bales, logs, cubes, and combinations thereof.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
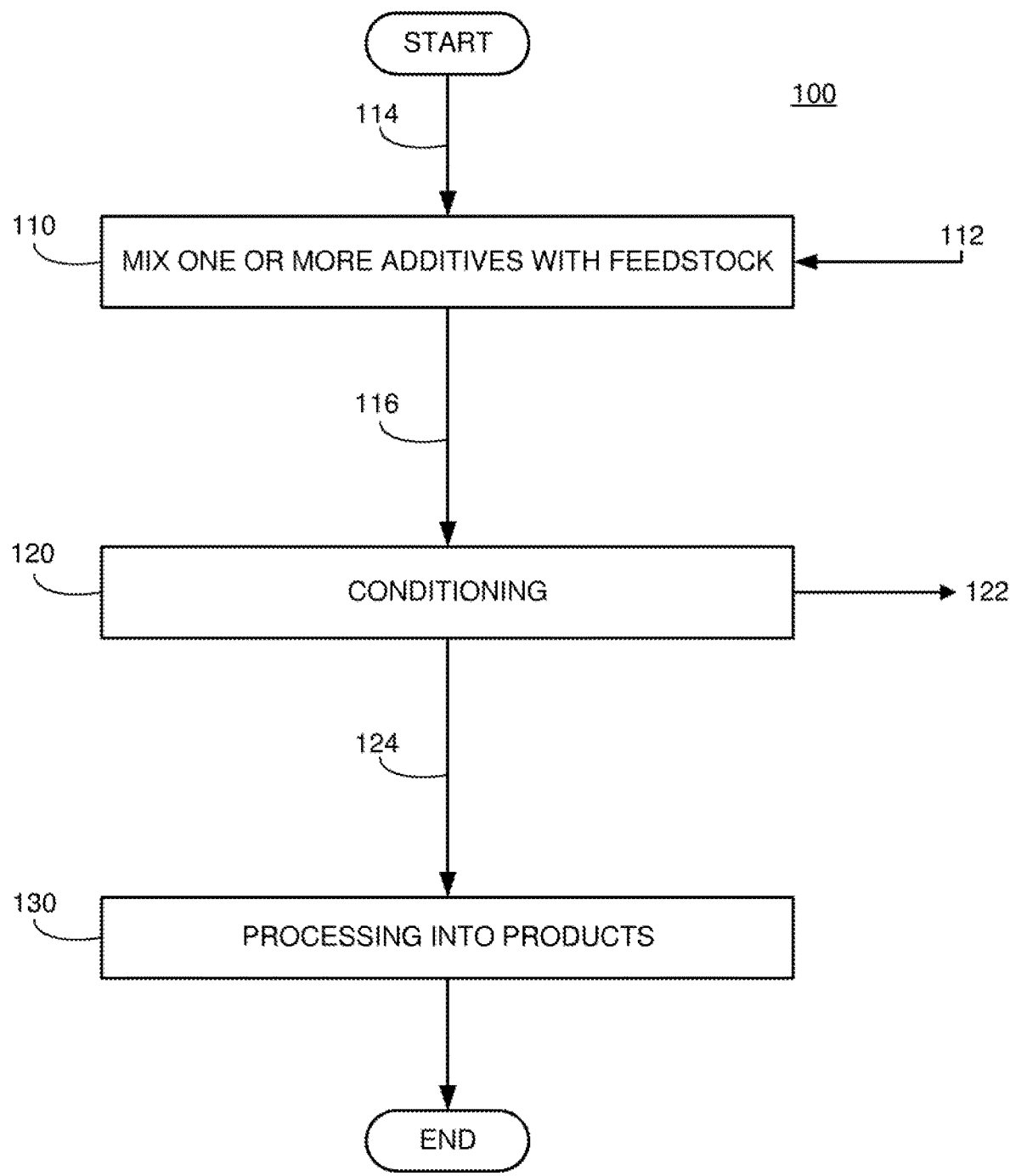
FIG. 1 illustrates an exemplary process according to some embodiments of the present disclosure.

Disclosed herein is a comprehensive solution for a compressive explosion-based process that concurrently dewaters, dries, fractionates, extracts and separates cell-based (biological) materials and particularly those that (a) are viewed as recalcitrant in terms of their reluctance to be industrially processed and (b) have liquid co-products that have market value. The presently disclosed technology can be agnostic to the state of the biological material. For example, in addition to processing green lignocellulosic feedstock, the presently disclosed technology can apply very well to processing cellulosic spent materials, such as coffee grains, waste paper, woody construction waste, poultry litter, poultry residuals such as feathers, bio-solids, compost production, and the like.

By way of another example, the liquid extract from orchard grass, when applied to a test lawn, removed the dandelions and rapidly grew the grass. This result would enable a municipality or lawn service to process the cut grass and then reapply the extract back on the lawn. The water savings as well as the avoidance of harsh fertilizers would have broad appeal. The grass extract has additional potential also. In another test, the orchard grass extracts were processed by heating. The proteins coagulated, thereby making this process suitable for the much-pursued leaf protein concentrate applications and a very viable alternative to the Pro-Xan process. Such advancements can greatly expand the design space of, for example, the "meatless protein" market.

The presently disclosed technology not only concurrently dewaters, dries, fractionates, extracts and separates plant material, but it also fundamentally transforms the resulting fiber with the plant cells completely exposed. All this renders the material ready for the follow-up processing for many industry applications such as bioenergy feedstock, advanced materials production, absorbents manufacture, soil amendments, water filtration systems, strengthening agents for the construction industry, inputs for Biopharma, fungus and yeast substrates, and many more, some examples of which will be outlined below.

The presently disclosed technology can condition wood fiber to an extent that it is optimized for inputs for industries that utilize pulp, such as paper-making industries, fiber board manufacturing, and the like. The tremendous reduction in particle size allows for quicker conversion. Many products are now feasible, most notably carbonized products such as graphene and the like. In terms of graphene, such a process can enable lower-cost production, allowing it to be added to fabrics for better aesthetics and performance, such as in terms of moisture wicking and pest barriers (e.g., mosquitoes.) Graphene is also perfectly suited as an input for degradable electronics, renewable carbon materials for electrochemical energy storage, and circuit substrates, thereby replacing millions of tons of hazardous material placed in landfills around the world every year.

Additionally, advanced processes are being developed that utilize organic phenol-based chemistries such as humic acid to serve as building blocks for advanced materials used in green energy systems such as supercapacitors. The liquid extract produced by processes of the present disclosure can be rich in humic and fulvic acids, as well as other organic acids.

The environmental challenges imposed by an oversupply of plastics in the world necessitate solutions for recycling. By utilizing products of the present disclosure, less plastic can be used. Such materials are often referred to as wood-plastic composites. In combination with products of the present disclosure, better cross-linking can occur with a plastic feedstock. This improved effect can enable improved consumer goods, such as composite decking. Moreover, the products disclosed herein provide a small particle size necessary to simulate the appearance of real wood and achieve improve material properties.

Research is also advancing that produces sustainable polymers made from carboxylic acid that prevents misting of jet fuel in the event of crash. Certain products of the present disclosure are rich in organic carboxylic acids.

3D printing is now mainstream, but the preponderance of materials utilized is largely synthetic. Products of the present disclosure can be used as a filament for 3D printing, due to improved form-factor and small particle size.

Cellulose nanomaterials such as nanocrystals and nanofibrils are very small, cylinder shaped particles that are produced from lignocellulosic materials. The present technology can accelerate its production and reduce its associated cost. Cellulose nanomaterials are currently being used in many industries, fields and disciplines around the globe, in various applications such as chemical manufacturing, pulp and paper, composites, food packaging and cosmetics.

Cellulose nanocrystals are unique nanomaterials derived from the most abundant and almost inexhaustible natural polymers, such as cellulose. The material has a wide and exciting potential in many industries. The exposed cellulose once viewed as cost-prohibitive to obtain from trees and the like can now be converted into nanocrystals for use in medical, material sciences, and electronics. The presently disclosed technology can condition the wood fiber by consolidating the lignin into exposed "drops" on the cellulose surface, which consequently lays the cellulose barer. This effect then can allow developing industrial processes to produce the cellulose nanocrystals by removing the lignin in more-cost effective and more environmentally friendly way.

Processes and products of the present disclosure can serve as feedstock to allow for the production of sustainable polymers from fragrant molecules often contained in aromatic species such as pine, witch hazel, *eucalyptus*, and the like. Given the struggles evidenced in the world today from polymers and plastics produced by conventional petroleum feedstocks, such processes of the present disclosure can provide an improvement in polymer production.

Recent advances in electrochemistry have occurred that simplify the creation of valuable and coveted molecules that are used for drugs, electronics, and the like. Processes of the present disclosure can generate important reactive intermediate molecules known as a carbocation needed for ether synthesis from inexpensive carboxylic acids. Products of the presently disclosed technology is rich in carboxylic acids, thereby providing even less-expensive feedstocks for this critical process.

The unique and cost-effective manner in which raw, green lignocellulosic feedstock can be conditioned according to the technology of the present disclosure makes available many applications in horticulture. These applications range from replacing non-sustainable growing substrates such as peat and other nonrecyclables, to producing very effective and organic soil amendments to applying the liquid extract as organic fertilizers.

It is found that products of the present disclosure produced by the chemo-mechanical cellular explosion of lignocellulosic material can preserve freshly cut plants such as industrial hemps, tomato stem, and/or succulents for extended periods of time before putting into soil for rooting. Applying the products to vegetables can also preserve them for extended shelf life.

Typical greenhouse substrates consist of peat and perlite. Peat is a hydrocarbon and non-renewable. Processes of the present disclosure can produce a wood feedstock in a form-factor conducive to growing mediums. A portion of products from the present technology can be substituted for a portion of the peat, thus reducing the dependence on hydrocarbons. Additionally, products of the present disclosure can inherently serve as an inoculated mushroom growing media. Due to its expanded form-factor, the products can also compress into a growing and erosion control mats and does so at significantly reduced cost.

Hydro mulch is a mix of fiber/grass seed/fertilizer that is applied to steep inclines where erosion could occur. Presently, mechanically treated wood fiber is used as a base material. In contrast, products of the present disclosure can offer a superior product produced with substantially less energy and emissions at a much lower price. The consequence of this is less top soil erosion and cleaner waterways. Hydroseeding is a mixture of grass seed, fertilizer and wood fiber. Products of the present disclosure can provide greater moisture absorbency, thus helping to accelerate seed germination.

Demand for natural and organic food is rapidly increasing. Conversely, continuous farming drains the soil of its vitality. Due to its nature produced by organic acids, sugars, humic/fulvic acids and a very diverse amount of amino acids, products of the present disclosure can create a soil environment that attracts the necessary microbial activity that is vital for the fixation of nitrogen and other nutrients in the soil.

The presently disclosed technology can allow for the extraction of bio-stimulants found in willows and other water-laden feedstocks that were once considered ineffective for processing due to the cost associated. Additionally, the characteristics of products of the present disclosure can provide for very specialized gene expression and controls once considered not possible by organics. The unadulterated nature and quantities of contained organic chemicals such as the various glutamine concentrations found in different species provides for very powerful horticultural methodologies. For example, a liquid extract produced from processes of the present disclosure utilizing hardwood species can be used as a cloning agent for pecans. Pecan trees can be started from seed or cloned from stems of live trees. The process of cloning presents challenges in the survival of the clone. The quicker that the clone is able to add healthy roots, the chances of its survival increase dramatically. The numerous organic acids found in products of the present disclosure are the building blocks for producing growth hormones that stimulate healthy and rapid root growth.

In another example, for certain species of feedstocks and particularly for that of the bark components, the presently disclosed technology can extract a considerable amount of tannin. Research is proving that remarkable changes in soluble nitrogen manifests in soils after regular applications of tannin and related phenolic compounds. These tannins are utilized by soil microorganisms as substrates, thereby increasing microbial demand for nitrogen and immobilization in microbial biomass. This increase translates to more nitrogen is being fixed by the microbes, making more nitrogen available to plants.

Products of the present disclosure can also offer pest control and defensive mechanisms to the horticultural markets once considered the monopolized domains of synthetic chemicals. Allelopathic effects made possible by products disclosed herein can serve as an example: the liquid extracts can enable new but sustainable approaches to weed control. The liquid extracts from hardwood can be very effective for nematode control also, which is imperative to preserve millions of dollars in produce. Various combinations of phenols and over-applications of other bio-stimulants and amino acids are very effective growth control options to that of synthetic chemicals.

The presently disclosed technology, such as fiber and liquid extracts produced from it, offers the construction markets inputs never available. The availability of the fiber can catalyze the development of newly engineered lumber, concrete, and asphalt formulations, resins, and preservatives.

Wood fiber is a very good sound insulator. Such products are popular in Europe and are gaining ground here in the United States. Products of the present disclosure can provide even better insulation, due to improved densification of the smaller particle sizes. Such products of the present disclosure can also enable improved fiber-based or particle-based boards such as Medium Density Fiber (MDF). For such applications as fiber cement siding, the expanded format of the products disclosed herein can provide additional support to concrete based siding. The presently disclosed technology also allows the use of alternative board material such as giant reed and the like, thereby improving the carbon cycling for the environment. The format of the products of the present disclosure can also allow for less binder to be utilized in the board construction, thereby granting another environmental advantage.

Products of the present disclosure can also be used in the advancement of engineering boards and siding. Lignin is a major component of wood fiber and is composed of various phenol groups. Using the phenol groups contained in the extract, sustainable foam boards may now be constructed. This is made possible by the ability of the present technology to produce a portion of the lignin contained in the wood fiber as solubilized in a liquid extract. These extracted phenols can then be utilized in the formulation of foam boards.

Products disclosed herein can also help to reinforce concrete. In order for concrete to support high loading, it must be reinforced. Typically, rebar steel is used to reinforce concrete. The products of the present disclosure can be a very good reinforcement mechanism for concrete.

The technology disclosed herein can be used to make engineered bamboo articles, such as flooring. Before bamboo can be converted into value added products, it has to be broken down. The processes of the present disclosure can allow for the bamboo fiber to be broken down into a material that can easily be converted to valuable products such as bamboo composite boards and bamboo flooring.

The technology disclosed herein can allow for the partial removal of lignin from lignocellulosic fiber. This lignin can be collected in a liquid extract. From this extract, the lignin can be isolated and then utilized as a component for natural asphalt.

Certain species of wood such as teak, red oak, and the like produce liquid extracts via the presently disclosed technology that can act as natural wood preservative. Such processes are generally expressed as acetylation. Acetic acid contained in the extract can create an environment where mold cannot grow. Once considered not scalable to a sufficient and cost-effective industry magnitude, the presently disclosed technology can make acetylation possible.

The presently disclosed technology can contribute significantly to environmental and remediation markets. Products of the present disclosure can create various adsorbents and filter medias, as well as accelerate the composting of biosolids. Adsorbents are utilized in nearly every industrial application, where spills can be a problem. The products disclosed herein can show much higher absorbency rates than commonly used material such as clay or sawdust.

Filtration is a part of many industrial processes. Wood fiber is used in many applications. Filtration effectiveness has a direct correlation to the surface area of the filter media. Products of the present technology can provide significantly greater surface area than typical machined wood fiber. The processes disclosed herein can also be very scalable thereby allowing large issues to be addressed, such as the control of red-tide and algae issues caused by fertilizer run-off.

Bio-solids are becoming a very large problem in the world. Disposal via land applications is now proving to be a less-than-optimal mechanism due to metals and other materials contained. Composting is quickly becoming the preferred approach to disposal. The products produced by the present technology can contain sugars and other molecules that rapidly accelerate the growth of necessary bacteria needed. Subsequently, the metabolites of these bacteria build upon the already-rich nutrient concentration contained in the composted bio-solids.

Additionally, the products produced by the present disclosed technology can be rich in amino acids that are proving to be very valuable phytopharmaceutical inputs to combat cancer and other diseases. Diethyl ether extracts and alkaloids can make possible anticancer medications for the treatment of breast cancer and dysfunctional maladies to human health. Additionally, it has been found that quantitative reductions in short-chain fatty acids, especially butyrate, contribute to the progression of chronic kidney disease and gastrological issues. The products disclosed herein can be rich in such short-chain fatty acids when fermented and processed. The products can also contain berbeine depending on feedstock species, which assists the lowering of sugar and leads to a maintenance of healthy cholesterol levels; this serves as a powerful tool for the treatment of diabetes.

Additionally, various plant-based and non-plant-based feedstocks can be extracted for specific medicinal purposes. The present technology can be very effective in hemp and *cannabis* processing. The liquid extracts render valuable cannabinoids and other nutraceuticals that offer new treatments. Various antibacterial properties of flavonoids from kino (sap) of the *eucalyptus* tree are also made possible by our technology.

The present technology can contribute significantly to human health applications. Various components of the products of the present disclosure can be used to produce insecticides and pesticides from such obstinate and exotic feedstock as oak and bloodroot. The technology also makes possible very low-cost products for aromatherapy and other terpenes for engineered aroma inputs to *cannabis* and specialized/engineered wines.

Experimentation is also underway to use the present technology for the production of insoluble dietary fiber and its inclusion as a food additive. Numerous studies have revealed increased physiological and psychological improvements when good bacteria utilize this type of insoluble fiber as substrates during their gastrological migration through the body.

Aside from the gastrological benefits, the short- and medium-chain fatty acids made available via products of the present disclosure can exhibit antimicrobial activity for oral microorganisms. This type of treatment will contribute to the prevention of tooth and gum diseases.

Mold and mildew have been a growing problem with residential housing for decades. Harsh chemicals and sprays are the conventional approach to eradicating the issue. However, by using the presently disclosed products produced from hardwoods other phenol-rich feedstocks, the present technology can enable an organic mold control mechanism for mold-infested basements and the like.

The presently disclosed technology can have immediate and direct applications to agricultural markets. The disclosed products can enhance litter and bedding applications, as well as improve animal health when added to feed and drinking water. The disclosed products can also have direct applications to the prevention and the treatment of certain animal disease and illness. Additionally, the present technology can also contribute to forestry and thereby participate in a circular economy when applied to wood fiber that is specifically farmed.

The products disclosed herein, such as fibrous materials, due to having very large surface area, can create animal bedding that is extremely adsorbent. This attribute allows harmful moisture and degassing (e.g., ammonia) to be managed. The products can also be very effective for use in drying and warming certain species of livestock. For example, when pigs are born, they are covered in moisture and their skin sensitivities are often high. By applying such fibrous materials to the pigs' skin after birth, the moisture can be rapidly wicked and the skin dried thereby allowing their body temperature to rise more quickly.

The large surface area can also allow bio-char to be produced more efficiently than conventional methods today. Bio-char is also a very effective adsorbent and particularly in sequestering ammonia. Blending biochar with products of the present disclosure can serve as a healthier environment for livestock, and particularly poultry where moisture and ammonia are problematic.

In terms of animal feed, the present technology can contribute to the growth and care of many species and including fish. The organic acids in products of the present disclosure can to serve as an alternative to antibiotics. Studies indicate that pigs fed with a diet inclusive of organic acids show improved average daily feed consumption and average daily weight gain. Some products of the present disclosure can contain tryptophan and a substrate of very small particle-sized fibers that have a form-factor similar to a digestate. Tryptophan is an essential amino acid in swine diets that is important for stimulating feed intake and subsequently, growth performance. Monogastric organisms such as pigs do not produce tryptophan, so it must be included as part of their dietary supplement.

Products of the present disclosure can also serve as a very effective substrate for various yeasts, such as *Candida utilis*, that create proteins. These proteins have potential for fish feed alternatives. Additionally, for some exotic fish species that have ruminant-like digestive systems, the exposed cellulose exhibited in products of the present disclosure can be more quickly digested as a food source. Lastly, feedstocks such as seaweed and other high-protein herbaceous feedstocks can be processed by the present technology for alternative, plant-based proteins as well. Substituting plant-based proteins for conventional fishmeal returns significant environmental dividends.

For ruminants such as cattle, sheep, and goats, the present technology can offer a number of advantages. Ruminant digestive systems have the potential to digest lignocellulosic materials if the contained lignin is conditioned sufficiently to expose the cellulose. The presently disclosed technology can aggregate the lignin into "droplet" forms, therefore rendering the cellulose more accessible to the cellulases in the animal gut and thereby improving digestion and nourishment. Certain species of wood (e.g., larch) are also proven to boost cattle liver health, being that they are high in arabinogalactans, lignin, flavonoids, and diterpenes. Making available these types of feedstocks to ruminants, particularly those feedstocks once viewed as too recalcitrant would make a world-wide impact relative to human nutrition and well-being.

Certain sizes and specifically engineered form-factors of lignocellulosic fiber can enable a targeted activation of organic acids such as butyrate-2 that consequently produces specific microbiota in the animal gut. The ability of the present technology to process different fiber form-factors, for different species, is critical to the commercialization of this process. Beneficial modulation of the gut microbiome is also "butterflied" into numerous metabolic changes and interdependent pathways that produce short chain fatty acids. These types of prebiotic products are vital for the livestock industry to meet the demand for natural food products.

The presently disclosed technology can benefit poultry also. Recent consumers are shying away from poultry that are fed antibiotics. As antibiotics do improve the health and survivability of poultry, a possibility exists that traces of these antibiotics remain in the bird after slaughter. Tannins, due to their antimicrobial nature as well as fatty acids, have been proven to combat the growth of pathogens in poultry rearing. Products disclosed herein, such as a liquid extract, can contain and create the valuable fatty acids and tannins. As such, products of the present disclosure can be included in poultry feed and water systems to improve bird health without the addition of synthetic antibiotics.

In a recent finding, the butyric acid produced by the fermentation of certain products of the present disclosure when mixed with zinc has proven to reduce the occurrence of woody breast in commercial broilers in the poultry industry. Woody breast describes a quality issue stemming from a muscle abnormality in a small percentage of chicken meat. Although this does not pose a health risk to consumers, it causes the meat to be deemed undesirable.

The present technology can also have applications in agroforestry, commonly referred to as tree farming. Agroforestry is a type of agriculture that involves the planting care, and sustainment of trees or other woody plants. Being that the products of the present disclosure can be originally derived from the xylem and phloem of a tree, once extracted and processed, they can provide a formulation of nutrients and care products for this industry. Prior to the present technology, the liquids in trees were evaporated off the fiber and converted to volatile organic compounds that created emission control challenges.

The presently disclosed technology can contribute directly to production of sustainable and clean energy. Applications can range from biofuels and bio-refineries, wood pellets, and even hydraulic fracturing industries for conventional fuels.

The present technology can utilize green (wet) feedstock to produce a conditioned and fractionated fiber that directly creates a highly-durable, low-moisture, and high-energy wood pellet. It can do so without the use of conventional sizing machinery such as hammer mills and without the need for enormously expensive indirect drying systems. The avoidance of these systems and their consequent capital and recurring costs offers the wood pellet industry a transformative paradigm shift; one that will eliminate the dependence on subsidies and create worldwide industry processing alternative and very available feedstocks once viewed as too wet to process such as forestry and farm residue, bamboo, waterborne biomass (e.g., algae, seaweed, kelp, etc.) and other high-moisture species.

The presently disclosed technology can also contribute to the value of conventional pelleting methods. Producing quality wood pellets with conventional means is a difficult challenge. With improved pellet durability as the goal, producers have searched extensively for an effective binder to improve pellet durability. When products of the present disclosure, such as dry pulp product, are mixed with conventionally-dried wood fiber, it can allow for greater densification of the pellet and better utilization of the lignin for binding.

The cellulosic component of lignocellulosic fiber has always been eyed as a potential base stock for cellulosic ethanol production. However, in order to be a viable feed stock, the lignin must be removed to some degree by the biorefineries to allow sufficient exposure of the cellulose to specific cellulases. The processes of the present disclosure can allow for the exposure and partial removal of lignin. Further processing can allow for the easy removal of the remaining lignin. Furthermore, the use of a low operating temperature can prevent the formation of inhibitors, which can have a negative impact on the effectiveness of the cellulases. The processes offer greater exposure of the cellulose, increasing enzymatic effectiveness. Such products can also be applied to the production of biobutanol and other bioenergy products. The format of certain products rendered from the presently disclosed technology can also now be suitable to make cleaner biorefining approaches effective. These include, but are not limited to, the organosolv and Simultaneous Saccharification and Fermentation (SSF) processes.

In terms of drilling industries such as natural gas and petroleum, the present technology can be applied also. For example, lost circulation material is used extensively in the drilling industry. It helps to retard mud loss into fractures or highly permeable zones. The smaller particle sizes produced by the presently disclosed technology allows for a product with better flowability and permeability to seal cracks and crevices inherent in drilling for oil. In another example, tannates from products of the present technology have proven to be a very good, environmentally-safe drilling fluid.

The presently disclosed technology can also contribute directly to the food and beverage market. Products of the present technology can be used to better a number of the associated senses, including but not limited flavor enhancements, palate sensations, and smell augmentation. The products can also participate in nutrient upgrades and the production of sweetening aids and as supporting ingredients for foods containing flour.

Utilizing the tannins in products of the present disclosure and specifically the ellagitannins contained therein, wine producers can engineer the "dryness" of their product and emulate that effect conventionally produced in the oxidation process via time as made available by the oak barrels.

Similarly, some of the phenolic compounds found in products of the present disclosure can be supplemented into food products as a nutritional value; the anthocyanin in certain lignocellulosic species has been proven to improve cognitive functioning.

In another example, utilizing the SSF process subsequent to pulping, the acetoin produced can be used as a food flavoring in baked goods. The present technology can also participate very actively in the production of torula yeast, scientifically known as *Candida utilis*. Products of the present disclosure can serve as a substrate for its growth. It is widely used as a flavoring in processed foods and pet foods. The form-factor of other products of the present disclosure can also accelerate the production of food-grade cellulose. This product is regularly found in as a thickener and bulker for tomato sauces, salad dressings, ice creams, energy bars, pasta, bread, and many other products.

The present technology can also contribute very effectively to the production of xylitol, a naturally occurring alcohol found in certain lignocellulosic feedstocks. It is widely used as a sugar substitute and in "sugar-free" chewing gums, mints, and other candies. The presently disclosed processes can condition the feedstock, such as birch, far more cost-effectively, lowering the overall cost. It also allows markets such as pulp-and-paper and biorefineries to establish co-product streams where conventionally that opportunity was lost.

Pulp is the fibrous material produced either chemically or mechanically (or by some combination of chemical and mechanical means) from wood or other cellulosic raw material. The wood cell has a nonliving cell wall, made of cellulose fibers, hemicellulose, and lignin which gives strength and support to the cell wall. Lignin holds the cellulose fibers together in the cell wall. Therefore, lignin must be removed to separate the individual cellulose fibers, which eventually become paper.

Conventional pulping processes inflict very difficult environmental issues. In fact, the industry is traditionally one of the largest contributors of industrial air, water, and land emissions in the world primarily due to the harsh chemicals used. Thousands of tons of pollutants are released each year. The industry is also one of the largest consumers of energy and water in the world, using more water to produce one ton of product than any other industry.

The industry is experiencing tremendous pressure from society to address these challenges. Research is being applied to the development of sustainable pulping mechanisms, including the use of environmentally-friendly chemicals and lower-energy approaches to mechanical conditioning of the feedstock.

Steam explosion is a process of great promise for the industry. However, in a conventional form, it has shown many economic problems which include the insufficient destruction of lignin-carbohydrate complex and, in the case of biorefinery and paper application, possible generation of fermentation inhibitors. Additionally, for the engineered lumber segment, the fiber also requires drying before it can be processed further.

The presently disclosed technology can offer substantial advantages to both the conventional process and the steam-explosion process. Relative to the conventional process, no harsh chemicals are used and little to no monosaccharide degradation occurs. The energy requirements are considerably less, and no environmental issues result. On the contrary, products disclosed herein, such as the liquid product, can capture the soil nutrients and tree biologics for application. The resulting fiber is also very susceptible to the action of cellulases.

In terms of bio-refineries and paper production, as a result of the effectiveness of processes of the present disclosure, cost-effective pulping processes such as organosolv pulping are now possible. This method uses organic solvents to break down the lignin and hemicellulose. This method is considered to be the cleanest of contemporary methods in use today.

In terms of products, the present technology can substantially reduce the cost necessary to produce cardboard, molded pulp, and fluff pulp as well. Most of the feedstock required to make these products today is obtained from the recycling industry. The feedstock requires much processing to render it clean and useful again, consequently creating additional environment issues.

Engineered lumber includes manufactured wood products which are produced by binding fiber together with adhesives, or other methods of fixation to form composite materials. The present technology can contribute directly to the production of densified wood, Medium Density Fiberboard (MDF), and particle board. The present technology can also contribute directly to the developing transparent wood markets as well.

All the aforementioned engineered lumber products are manufactured from wood chips, sawmill shavings, or even sawdust, and a synthetic resin or other suitable binder, which is pressed and extruded. Conventionally, the feedstock necessary for this production must be dried; the presently disclosed technology can inherently dry the feedstock and avoid this costly step in the process. Emissions are also consequently avoided, and the fractionated form-factor of the fiber produced from processes of the present disclosure can be conducive to creating a strong product. The products when produced conventionally also require binders, most of which are not sustainable and cause additional environment challenges, both in production and in disposal/recycling. The presently disclosed technology can require less binder. Additionally, the liquid extract produced by the presently disclosed technology can be developed into a sustainable binding product to serve other market interests as discussed previously.

Effective utilization of waste streams very regularly requires dewatering, drying, and conditioning the feedstock. This is conventionally accomplished with various belt presses, extruders and cyclone treatments. Thereafter, the waste is then reduced down in size with additional mechanical processing. The presently disclosed technology can consolidate all these processes into one and conditions the feedstock to an extent previously impossible.

For example, the presently disclosed technology can process spent coffee grains very efficiently and make them available for pellet production. The pellets can then be incinerated as solid fuel for heat or electricity production or utilized in the rapidly-increasing grilling industry as a flavored smoke product. In another example, the present technology can process poultry feather quills for the production of keratin that provides a never-available form-factor for thin film applications as well as many others. In another example, the present technology can process citrus peels into a very unique form that allows it to be more-efficiently used a number of industrial applications. The extracted liquid from processes of the present disclosure also has much potential, particularly in the pursuit of organic chemical synthesis.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As used herein, the term "pulp" is understood to include lignocellulosic materials of varying moisture content, physical characteristics, bulk density, or species having been dewatered, dried, fractionated, and expanded.

As used herein, the term "exposed cellulose fiber" is understood to refer to cellulose fibers or fibrils that are not bound within a cellular wall. For example, cellulose fibers can be exposed via cell explosion processes of the present disclosure.

As used herein, the term "entangled" is understood to refer to at least two fibers being entangled when at least a portion of each fiber is intertwined with and non-parallel to at least a portion of a second fiber.

Disclosed herein are processes comprising: combining an additive with a feedstock to obtain a first mixture, the feedstock comprising a fibrous material and water, the fibrous material comprising lignin, cellulose, and hemicellulose; and condition the first mixture to obtain a liquid product and a dry pulp product.

Also disclosed herein are conditioning processes, machines, and methods for use in conjunction with the aforementioned processes.

Also disclosed herein are a liquid product made by the aforementioned processes, a dry pulp product and/or fibrous pulp material made by the aforementioned processes, and fibrous pellets made by the aforementioned processes.

Disclosed herein are processes, systems, and methods for processing and/or producing materials comprising a fibrous material. The fibrous material can comprise natural fibers, such as cellulosic fibers. For instance, the fibrous material can comprise wood fibers. The wood fibers can be provided in the form of a wood pulp or other lignocellulosic fibrous source. For instance, the wood fibers can be provided in the form of southern bleached softwood Kraft pulp. Suitable examples of fibrous sources can include, but are not limited to, fluff pulp, dissolving pulp, mechanical pulp, chemical pulp, chemo-mechanical pulp, recovered paper pulp, semi-mechanical pulp, semi-chemical pulp, soft cook fully chemical pulp, consumer waste products such as clothes, viscose, rayon, lyocell, or any combination thereof. Additionally, the fibrous material can be any material that comprises lignin and hemicellulose.

The fibrous material can also be in the form of wood chips, wood fibers, or other wood sources. Other suitable examples of wood sources include hardwood, softwood, aspen, balsa, beech, birch, mahogany, hickory, maple, oak, teak, *eucalyptus*, pine, cedar, juniper, spruce, redwood, or any combination thereof. It is understood that any other known sources of wood fibers and lignocellulosic materials can be used. Alternatively, the fibrous material can be provided in the form of natural non-wood or alternative fibers. Suitable examples of natural non-wood alternative fibers that can make up the fibrous material can include, for example, barley, bagasse, bamboo, wheat and wheat straw, flax, hemp, kenaf, *Arundo donax*, corn stalk, jute, ramie, cotton, wool, rye, rice, *papyrus*, esparto, sisal, grass, abaca, shrubs, *miscanthus*, giant reed, alfalfa, woody vines, flowers, *wisteria*, honeysuckle, *clematis*, kudzu, coffee and other beans/legumes, *stevia* and other functional plants, other lignocellulosic species, fast-growing grasses, or any combination thereof. It is understood that the fibrous material can include any other natural fibers from any source or any combination of natural fibers. In some embodiments, the fibrous material can be provided from cellulosic fibers that can be prepared from the wood pulp or otherwise provided fiber source by means of a mechanical process such as hammer-milling or other comminution processes.

The fibrous material can comprise fibers having an average length from approximately 0.01 mm to 12 mm. For example, the fibrous material can comprise fibers having an average length of 0.01 mm or greater (e.g., 0.05 mm or greater, 0.10 mm or greater, 0.15 mm or greater, 0.20 mm or greater, 0.25 mm or greater, 0.30 mm or greater, 0.35 mm or greater, 0.40 mm or greater, 0.45 mm or greater, 0.50 mm or greater, 0.55 mm or greater, 0.60 mm or greater, 0.65 mm or greater, 0.70 mm or greater, 0.75 mm or greater, 0.80 mm or greater, 0.85 mm or greater, 0.90 mm or greater, 0.95 mm or greater, 1.0 mm or greater, 1.1 mm or greater, 1.2 mm or greater, 1.3 mm or greater, 1.4 mm or greater, 1.5 mm or greater, 1.6 mm or greater, 1.7 mm or greater, 1.8 mm or greater, 1.9 mm or greater, 2.0 mm or greater, 2.1 mm or greater, 2.2 mm or greater, 2.3 mm or greater, 2.4 mm or greater, 2.5 mm or greater, 2.6 mm or greater, 2.7 mm or greater, 2.8 mm or greater, 2.9 mm or greater, 3.0 mm or greater, 3.5 mm or greater, 4.0 mm or greater, 4.5 mm or greater, 5.0 mm or greater, 5.5 mm or greater, 6.0 mm or greater, 6.5 mm or greater, 7.0 mm or greater, 7.5 mm or greater, 8.0 mm or greater, 8.5 mm or greater, 9.0 mm or greater, 9.5 mm or greater, 10 mm or greater, 10.5 mm or greater, 11 mm or greater, or 11.5 mm or greater).

In some embodiments, the fibrous material can comprise fibers having an average length of 12 mm or less (e.g., 11.5 mm or less, 11 mm or less, 10.5 mm or less, 10 mm or less, 9.5 mm or less, 9.0 mm or less, 8.5 mm or less, 8.0 mm or less, 7.5 mm or less, 7.0 mm or less, 6.5 mm or less, 6.0 mm or less, 5.5 mm or less, 5.0 mm or less, 4.5 mm or less, 4.0 mm or less, 3.5 mm or less, 3.0 mm or less, 2.9 mm or less, 2.8 mm or less, 2.7 mm or less, 2.6 mm or less, 2.5 mm or less, 2.4 mm or less, 2.3 mm or less, 2.2 mm or less, 2.1 mm or less, 2.0 mm or less, 1.9 mm or less, 1.8 mm or less, 1.7 mm or less, 1.6 mm or less, 1.5 mm or less 1.4 mm or less, 1.3 mm or less, 1.2 mm or less, 1.1 mm or less, 1.0 mm or less, 0.95 mm or less, 0.90 mm or less, 0.85 mm or less, 0.80 mm or less, 0.75 mm or less, 0.70 mm or less, 0.65 mm or less, 0.60 mm or less, 0.55 mm or less, 0.50 mm or less, 0.45 mm or less, 0.40 mm or less, 0.35 mm or less, 0.30 mm or less, 0.25 mm or less, 0.20 mm or less, 0.15 mm or less, 0.10 mm or less, 0.05 mm or less).

In some embodiments, the fibrous material has a length of 0.01 mm to 12 mm (e.g., 0.3 mm to 7 mm, 0.5 mm to 5 mm, 0.7 mm to 2.8 mm, 2.9 mm to 8 mm, 8 mm to 12 mm, 0.01 mm to 1 mm). In some embodiments, the fibrous material comprises a blend of one or more fibers that are of different average fiber lengths. In other words, in some embodiments, the fibrous material has bimodal (or trimodal, etc.) average fiber length. The fibrous material can, in some examples, have an average length of fibers from about 1 angstrom to about 5000 microns.

The fibrous material can comprise fibers having various cross-sectional shapes (e.g., round, scalloped oval, cruciform, haxachannel, etc.). The fibrous material can have a cross-sectional size based on the cross-sectional shapes. As used herein, the term "cross-sectional size" is understood to refer to the greatest dimension of a plane perpendicular to the length of the fibers (i.e., the diameter in a cylindrical fiber, the diagonal in a rectangular fiber). In some embodiments, the average maximum cross-sectional size of the fibers in the fibrous material (i.e., the average diameter for a round fiber) is from 100 nanometers to 1000 microns. In some embodiments, the fibrous material can have an average maximum cross-sectional size of 100 nanometers or greater (e.g., 150 nanometers or greater, 250 nanometers or greater, 350 nanometers or greater, 450 nanometers or greater, 550 nanometers or greater, 650 nanometers or greater, 750 nanometers or greater, 850 nanometers or greater, 950 nanometers or greater, 1 micron or greater, 5 microns or greater, 10 microns or greater, 15 microns or greater, 20 microns or greater, 25 microns or greater, 30 microns or greater, 35 microns or greater, 40 microns or greater, 45 microns or greater, 50 microns or greater, 55 microns or greater, 60 microns or greater, 65 microns or greater, 70 microns or greater, 75 microns or greater, 80 microns or greater, 85 microns or greater, 90 microns or greater, 95 microns or greater, 100 microns or greater, 200 microns or greater, 300 microns or greater, 400 microns or greater, 500 microns or greater, 600 microns or greater, 700 microns or greater, 800 microns or greater, or 900 microns or greater).

In some embodiments, the fibrous material can have an average maximum cross-sectional size of 1000 microns or less (e.g., 900 microns or less, 800 microns or less, 700 microns or less, 600 microns or less, 500 microns or less, 400 microns or less, 300 microns or less, 200 microns or less, 100 microns or less, 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, 20 microns or less, 15 microns or less, 10 microns or less, 5 microns or less, 1 micron or less, 900 nanometers or less, 800 nanometers or less, 700 nanometers or less, 600 nanometers or less, 500 nanometers or less, 400 nanometers or less, 300 nanometers or less, 200 nanometers or less).

In some embodiments, the fibrous material can have an average maximum cross-sectional size of about 100 nanometers to about 1000 microns (e.g., 100 nanometers to 1 micron, 1 micron to 10 microns, 10 microns to 25 microns, 25 microns to 50 microns, 50 microns to 75 microns, 75 microns to 100 microns, 25 microns to 75 microns, 25 microns to 100 microns, 100 nanometers to 10 microns, 100 nanometers to 25 microns, 1 micron to 25 microns, 10 microns to 75 microns, from 1 micron to 1000 microns, from 1 micron to 900 microns, from 1 micron to 800 microns, from 1 micron to 700 microns, from 1 micron to 600 microns, from 1 micron to 500 microns, from 100 microns to 1000 microns, from 100 microns to 900 microns, from 100 microns to 800 microns, from 100 microns to 700 microns, from 100 microns to 600 microns, or from 100 microns to 500 microns). In some embodiments, the fibrous material comprises a blend of one or more fibers that are of different average maximum cross-sectional size. In other words, in some embodiments, the fibrous material has bimodal (or trimodal, etc.) average maximum cross-sectional size. In some embodiments, the fibers of the fibrous material can be present in the nanoscale, having an average cross section size of from 1 nanometer to 100 nanometers, or from 1 nanometer to 1000 microns.

Also disclosed herein is an additive material. The additive material can comprise, for example, a small molecule material, a surfactant, or a polymer. Without wishing to be bound by any particular scientific theory, the additive material can interact with lignin in the fibrous material to weaken the cellular structure of the fibrous material. The additive material can also act in a catalytic manner and/or as a drag-reducing agent during processing.

The additive can be a water-soluble material capable of interacting with lignin. The additive can be a surfactant, for example. A variety of surfactants can be included in the present disclosure to interact with the fibrous material (e.g., weakening the lignin), act in a catalytic manner, and act as a drag-reducing or dewatering agent during processing. The surfactants used in the present invention can contain a lipophilic nonpolar hydrocarbon group and a polar or ionic (e.g., cationic, anionic, zwitterionic, etc.) functional hydrophilic group. The anionic or polar functional group can be a carboxylate, ester, amine, amide, imide, hydroxyl, ether, nitrile, phosphate, sulfate, or sulfonate. The cationic functional group may be a primary amine, secondary amine, tertiary amine or quandary amine. The surfactants that are useful in the present invention may be used alone or in combination. Accordingly, any combination of surfactants may include anionic, cationic, nonionic, zwitterionic, amphoteric and ampholytic surfactants.

Accordingly, the surfactants for use in the present invention may be anionic, including, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium stearate, sodium laureth carboxylate, sodium polyacrylate, sodium trideceth carboxylate, sodium lauryl sarcosinate, sodium carboxymethyl cellulose, lauroyl sarcosine, and cocoyl sarcosinate. Specific examples of sulfates include sodium dodecyl sulfate (SDS), sodium lauryl sulfate, sodium lauryl ether sulfate, cationsodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, lignosulfonate, linear alkylbenzene sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, e.g., 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, dioctyl sodium sulfosuccinate (DOSS), C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

For an anionic surfactant, the counter ion is typically sodium but may alternatively be potassium, lithium, calcium, magnesium, ammonium, amines (primary, secondary, tertiary or quandary) or other organic bases. Exemplary amines include isopropyl amine, ethanolamine, diethanolamine, and triethanolamine. Mixtures of the above cations may also be used.

In some embodiments, the surfactants for use in the present invention may also be cationic, so long as at least one surfactant bearing a net positive charge is also included. Such cationic surfactants include, but are not limited to, primarily organic amines, primary, secondary, tertiary or quaternary. For a cationic surfactant, the counter ion can be chloride, bromide, methosulfate, ethosulfate, lactate, saccharinate, phosphate, acetate, and other organic acid anions. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide (CETAB), cetyl trimethyl ammonium chloride (CETAC), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, benzalkonium chloride, stearyl octyidimonium methosulfate, isostearaminopropalkonium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are distearyldimonium chloride, dicetyl dimonium chloride, benzethonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bisstearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride and cetylpyridinium chloride, can also be used.

The surfactants for use in the present invention may be nonionic, including, but not limited to, polyalkylene oxide carboxylic acid esters, fatty acid esters, fatty alcohols, ethoxylated fatty alcohols, poloxamers, polyalkylene oxidesm alkanolamides, polyacrylamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. An ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (e.g. alkyl polyglycosides) contain a hydrophobic group with about 6 to about 30 carbons and a polysaccharide (e.g., polyglycoside) as the hydrophilic group.

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, poly-N-vinyl formamide, cocamine oxide, cocamidopropylamine oxide, and lauramidopropylamine oxide; polyalkylene oxides such as polyethylene oxide (PEO), polypropylene oxide, and polybutylene oxide; polyethylene glycol (PEG) and polypropylene glycol and block copolymers thereof; polysorbates or Tweens such as polysorbate 20, polysorbate 40, polysorbate 60, and polysorbate 80; polyacrylamide-co-sodium acrylate (PAAM-co-NaA); polyacrylamide-co-(sodium2-(acrylamido)-2methylpropanesulfonate) (PAAM-co-NaAMPS); polyacrylamide-co-(sodium3-(acrylamido)-3methylbutanoate) (PAAM-co-NaAMB); and polyacrylamide-co-diacetone acrylamide (PAAM-coDAAM); polyampholytes (containing both negative and positive charges in the same polymeric chain) based on acrylamide (AM), sodium 2-acrylamido-2-methylpropanesulfonate (NaAMPS), (2-acrylamido2-methylpropyl) trimethylammonium chloride (AMPTAC), sodium 3-acrylamido-3-methylbutanoate (NaAMB), and 3-((2-acrylamido-2-methylpropyl)dimethylammonio)-1-propanesulfonate (AMPDAPS); gums such as Guar gum, Xanthan gum, Lucas Bean gum, Gellan gum, and gum Arabic; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

The surfactants for use in the present invention may be zwitterionic, meaning the same molecule has both a formal positive and negative charge. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety may contain one or more long, straight, cyclic, or branched, aliphatic chains of about 8 to 18 carbon atoms. Specific examples of zwitterionic surfactants include alkyl betaines such as cocodimethyl carboxymethyl betaine, coco betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; lecithins (phosphatidylcholine), such as soy lecithin; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

The surfactants for use in the present invention may be amphoteric. Examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

The surfactants for use in the present invention may also be a polymer such as N-substituted polyisobutenyl succinimides and succinates, alkyl methacrylate vinyl pyrrolidinone copolymers, polyvinylpyrrolidones, alkyl methacrylate-dialkylaminoethyl methacrylate copolymers, alkylmethacrylate polyethylene glycol methacrylate copolymers, and polystearamides.

Alternatively, the surfactant may be an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

The surfactant used in the present invention may also be a combination of two or more selected from the group consisting of anionic, cationic, nonionic, zwitterionic, amphoteric, and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of different types include, but are not limited to, a mixture of one anionic and one cationic surfactant, a mixture of one anionic and one nonionic surfactant, a mixture of one anionic and one zwitterionic surfactant, a mixture of one anionic and one amphoteric surfactant, a mixture of one anionic and one ampholytic surfactant, a mixture of one cationic and one nonionic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

The additive can have a molecular weight from about 30 g/mol to about 10,000,000 g/mol. The additive can have a molecular weight from about 500 g/mol to about 10,000,000 g/mol. The additive can have a molecular weight from about 50 g/mol to about 10,000,000 g/mol. The additive can have a molecular weight from about 100 g/mol to about 10,000,000 g/mol. The additive can have a molecular weight from about 250 g/mol to about 10,000,000 g/mol. The additive can have a molecular weight from about 1,000 g/mol to about 10,000,000 g/mol. The additive can have a molecular weight from about 1,000 g/mol to about 8,000,000 g/mol. The additive can alternatively have a molecular weight from about 5,000 g/mol to about 10,000,000 g/mol, from about 100,000 g/mol to about 10,000,000 g/mol, from about 500 g/mol to about 1,000,000 g/mol, from about 1,000 g/mol to about 1,000,000 g/mol, from about 1,000 g/mol to about 2,000,000 g/mol, from about 1,000 g/mol to about 3,000,000 g/mol, or from about 500 g/mol to about 8,000,000 g/mol.

Embodiments of the present disclosure can provide a dry pulp product. The dry pulp product can be made from fibrous material using processes of the present disclosure and can have an exploded cellular structure. The dry pulp product can be further processed into pellets, briquettes, bales, or other value-added products. The dry pulp product can have a particle size (e.g., average particle diameter) from about 1 mm to about 10 mm (e.g., from 1.5 mm to 9.5 mm, from 2 mm to 9 mm, from 2.5 mm to 8.5 mm, from 3 mm to 8 mm, from 3.5 mm to 7.5 mm, from 4 mm to 7 mm, from 4.5 mm to 6.5 mm, or from 5 mm to 6 mm).

Embodiments of the present disclosure can provide a fibrous pellet, comprising a fibrous material comprising lignin and water. The fibrous pellets of the present disclosure can be substantially dewatered. In other words, the fibrous pellet can comprise water in an amount of about 20% or less (e.g., 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, 1% or less, or 0.5% or less) by weight, based on the total weight of the fibrous pellet.

In some embodiments, the fibrous pellet can comprise water in an amount of about 0.1% or greater (e.g., 19% or greater, 18% or greater, 17% or greater, 16% or greater, 15% or greater, 14% or greater, 13% or greater, 12% or greater, 11% or greater, 10% or greater, 9% or greater, 8% or greater, 7% or greater, 6% or greater, 5% or greater, 4.5% or greater, 4% or greater, 3.5% or greater, 3% or greater, 2.5% or greater, 2% or greater, 1.5% or greater, 1% or greater, or 0.5% or greater) by weight, based on the total weight of the fibrous pellet.

In some embodiments, the fibrous pellet can comprise water in an amount from about 0.1% to about 20% (e.g., from 0.1% to 19%, from 0.5% to 18%, from 1% to 17%, from 1% to 20%, from 1% to 19%, from 1% to 18%, from 1% to 16%, from 2% to 18%, from 3% to 17%, from 4% to 16%, from 5% to 15%, from 6% to 14%, from 7% to 13%, from 8% to 12%, from 9% to 11%, from 0.5% to 4.5%, from 1% to 5%, from 1% to 4.5%, from 1% to 4%, from 1.5% to 3.5%, or from 2% to 3%) by weight, based on the total weight of the fibrous pellet.

The fibrous pellets of the present disclosure can present substantially improved mechanical properties and structural integrity over conventional fibrous pellets as well. For example, the fibrous pellet can have a pellet durability index (PDI) of 75 or greater (e.g., 76 or greater, 77 or greater, 78 or greater, 79 or greater, 80 or greater, 81 or greater, 82 or greater, 83 or greater, 84 or greater, 85 or greater, 86 or greater, 87 or greater, 88 or greater, 89 or greater, 90 or greater, 91 or greater, 92 or greater, 93 or greater, 94 or greater, 95 or greater, 96 or greater, 97 or greater, 98 or greater, 99 or greater, or 100). The PDI of the fibrous pellets can be measured using, for example, ASAE Standard S269.5 R2016. Additionally, the fibrous pellets of the present disclosure can have improved structural integrity. For example, the fibrous pellets can undergo substantially minimal degradation when submerged in water from about 1 minute to about 1 year. As used herein, "substantially minimal degradation" is defined by a bulk density of the fibrous pellets changing by an amount of 10% or less. In other words, the fibrous pellets undergo minimal swelling and/or water adsorption when submerged.

The fibrous pellet can also have a bulk density of about 15 kg/m$^3$ or greater (e.g., 20 kg/m$^3$ or greater, 25 kg/m$^3$ or greater, 30 kg/m$^3$ or greater, 35 kg/m$^3$ or greater, 40 kg/m$^3$ or greater, 45 kg/m$^3$ or greater, 50 kg/m$^3$ or greater, 60 kg/m$^3$ or greater, 70 kg/m$^3$ or greater, 80 kg/m$^3$ or greater, 90 kg/m$^3$ or greater, 100 kg/m$^3$ or greater, 150 kg/m$^3$ or greater, 200 kg/m$^3$ or greater, 250 kg/m$^3$ or greater, 300 kg/m$^3$ or greater, 350 kg/m$^3$ or greater, 400 kg/m$^3$ or greater, 450 kg/m$^3$ or greater, 500 kg/m$^3$ or greater, 550 kg/m$^3$ or greater, 600 kg/m$^3$ or greater, 650 kg/m$^3$ or greater, 700 kg/m$^3$ or greater, or 750 kg/m$^3$ or greater).

The fibrous pellet can have a bulk density of about 800 kg/m$^3$ or less (e.g., 20 kg/m$^3$ or less, 25 kg/m$^3$ or less, 30 kg/m$^3$ or less, 35 kg/m$^3$ or less, 40 kg/m$^3$ or less, 45 kg/m$^3$ or less, 50 kg/m$^3$ or less, 60 kg/m$^3$ or less, 70 kg/m$^3$ or less, 80 kg/m$^3$ or less, 90 kg/m$^3$ or less, 100 kg/m$^3$ or less, 150 kg/m$^3$ or less, 200 kg/m$^3$ or less, 250 kg/m$^3$ or less, 300 kg/m$^3$ or less, 350 kg/m$^3$ or less, 400 kg/m$^3$ or less, 450 kg/m$^3$ or less, 500 kg/m$^3$ or less, 550 kg/m$^3$ or less, 600 kg/m$^3$ or less, 650 kg/m$^3$ or less, 700 kg/m$^3$ or less, or 750 kg/m$^3$ or less).

The fibrous pellet can have a bulk density from about 15 kg/m$^3$ to about 800 kg/m$^3$ (e.g., from 20 kg/m$^3$ to 800 kg/m$^3$, from 25 kg/m$^3$ to 800 kg/m$^3$, from 30 kg/m$^3$ to 800 kg/m$^3$, from 35 kg/m$^3$ to 800 kg/m$^3$, from 40 kg/m$^3$ to 800 kg/m$^3$, from 45 kg/m$^3$ to 800 kg/m$^3$, from 50 kg/m$^3$ to 800 kg/m$^3$, from 60 kg/m$^3$ to 800 kg/m$^3$, from 70 kg/m$^3$ to 800 kg/m$^3$, from 80 kg/m$^3$ to 800 kg/m$^3$, from 90 kg/m$^3$ to 800 kg/m$^3$, from 100 kg/m$^3$ to 800 kg/m$^3$, from 150 kg/m$^3$ to 800 kg/m$^3$, from 200 kg/m$^3$ to 800 kg/m$^3$, from 250 kg/m$^3$ to 800 kg/m$^3$, from 300 kg/m$^3$ to 800 kg/m$^3$, from 350 kg/m$^3$ to 800 kg/m$^3$, from 400 kg/m$^3$ to 800 kg/m$^3$, from 450 kg/m$^3$ to 800 kg/m$^3$, from 500 kg/m$^3$ to 800 kg/m$^3$, from 550 kg/m$^3$ to 800 kg/m$^3$, from 600 kg/m$^3$ to 800 kg/m$^3$, from 650 kg/m$^3$ to 800 kg/m$^3$, from 700 kg/m$^3$ to 800 kg/m$^3$, from 750 kg/m$^3$ to 800 kg/m$^3$, from 100 kg/m$^3$ to 750 kg/m$^3$, from 100 kg/m$^3$ to 700 kg/m$^3$, from 150 kg/m$^3$ to 650 kg/m$^3$, from 250 kg/m$^3$ to 750 kg/m$^3$, from 300 kg/m$^3$ to 700 kg/m$^3$, from 350 kg/m$^3$ to 650 kg/m$^3$, from 400 kg/m$^3$ to 600 kg/m$^3$, or from 450 kg/m$^3$ to 550 kg/m$^3$).

Figure 5A:
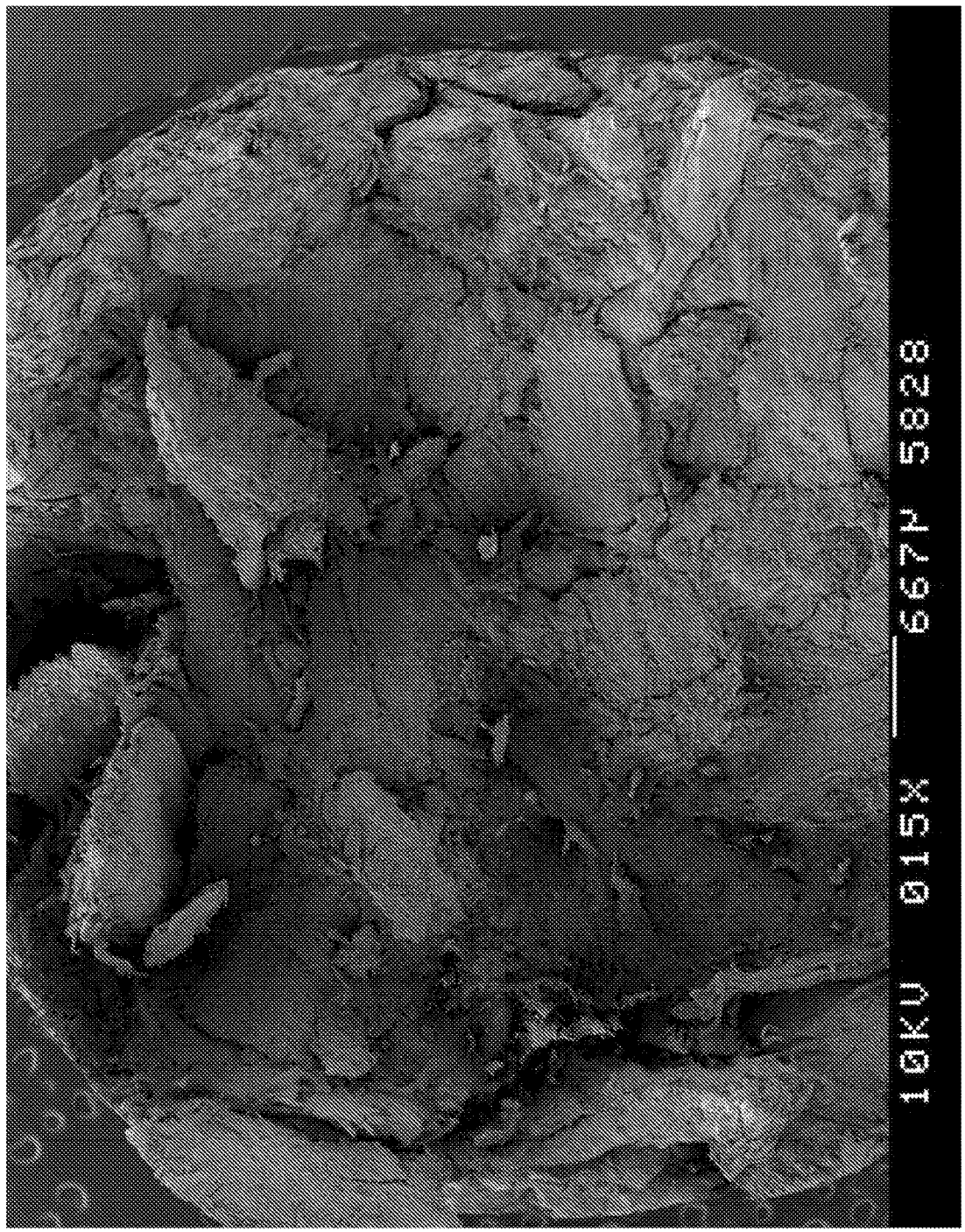
FIG. 5A is a scanning electron microscope (SEM) image of a fibrous pellet produced from a conventional process.
Figure 5B:
FIG. 5B is a SEM image of a fibrous pellet produced by a process according to some embodiments of the present disclosure.

The fibrous pellet can also comprise a plurality of exposed cellulose fibers in the fibrous material. Each of the plurality of exposed cellulose fibers can be entangled with at least one other exposed cellulose fiber, as shown in FIG. 5B. The exposed cellulose fibers can be present in the fibrous pellet in an amount of 2% or greater (e.g., 3% or greater, 4% or greater, 5% or greater, 6% or greater, 7% or greater, 8% or greater, 9% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, 90% or greater, or 95% or greater) by weight, based on the total weight of the pellet.

The exposed cellulose fibers can be present in the fibrous pellet in an amount of 99% or less (e.g., 3% or less, 4% or less, 5% or less, 6% or less, 7% or less, 8% or less, 9% or less, 10% or less, 15% or less, 20% or less, 25% or less, 30% or less, 35% or less, 40% or less, 45% or less, 50% or less, 55% or less, 60% or less, 65% or less, 70% or less, 75% or less, 80% or less, 85% or less, 90% or less, or 95% or less) by weight, based on the total weight of the pellet.

The exposed cellulose fibers can be present in the fibrous pellet in an amount from 2% to 99% (e.g., from 2% to 98%, from 2% to 95%, from 2% to 90%, from 2% to 85%, from 2% to 80%, from 2% to 75%, from 2% to 70%, from 2% to 65%, from 2% to 60%, from 2% to 55%, from 2% to 50%, from 2% to 45%, from 2% to 40%, from 2% to 35%, from 2% to 30%, from 2% to 25%, from 3% to 99%, from 4% to 99%, from 5% to 99%, from 5% to 95%, from 5% to 90%, from 5% to 85%, from 5% to 80%, from 5% to 75%, from 5% to 70%, from 5% to 65%, from 5% to 60%, from 5% to 55%, from 5% to 50%, from 5% to 45%, from 5% to 40%, from 5% to 35%, from 5% to 30%, or from 5% to 25%) by weight, based on the total weight of the fibrous pellet.

Embodiments of the present disclosure can also provide a liquid product derived from the fibrous material, the liquid product comprising solid or liquid particulates, bio-stimulant compounds, minerals, amino acids, organic acids, proteins, water, and lignin. The bio-stimulant compounds can include compounds such as humic acid, fulvic acid, or other organic acids. The liquid product can also comprise other bio-stimulant compounds including, but not limited to, humic acid derivates, humates, other organic acids, humic substances, humin, lignosulfonates, lactic acids, acetic acids, formic acids, citric acids, oxalic acids, uric acids, malic acids, other derivatives of soil organic matter, humic matter, other bioactive compounds and the like, or any combination thereof. The minerals can include potassium, phosphorus, nitrogen, calcium, magnesium, sulfur, sodium, iron, manganese, zinc, copper, other natural minerals and the like, or any combination thereof. The liquid product can further comprise amino acids, such as glutamic acid or tryptophan. The liquid product can further comprise other volatile and non-volatile organic compounds.

The bio-stimulant compounds can be present in the liquid product in an amount of about 0.001% or greater (e.g., 0.005% or greater, 0.01% or greater, 0.05% or greater, 0.1% or greater, 0.2% or greater, 0.3% or greater, 0.4% or greater, 0.5% or greater, 0.6% or greater, 0.7% or greater, 0.8% or greater, 0.9% or greater, 1% or greater, 1.1% or greater, 1.2% or greater, 1.3% or greater, 1.4% or greater, 1.5% or greater, 2% or greater, 2.5% or greater, 3% or greater, 3.5% or greater, 4% or greater, 4.5% or greater, 5% or greater, 5.5% or greater, 6% or greater, 6.5% or greater, 7% or greater, 7.5% or greater, 8% or greater, 8.5% or greater, 9% or greater, or 9.5% or greater) by weight, based on the total weight of the liquid product.

In some embodiments, the bio-stimulant compounds can be present in the liquid product in an amount of about 10% or less (e.g., 0.005% or less, 0.01% or less, 0.05% or less, 0.1% or less, 0.2% or less, 0.3% or less, 0.4% or less, 0.5% or less, 0.6% or less, 0.7% or less, 0.8% or less, 0.9% or less, 1% or less, 1.1% or less, 1.2% or less, 1.3% or less, 1.4% or less, 1.5% or less, 2% or less, 2.5% or less, 3% or less, 3.5% or less, 4% or less, 4.5% or less, 5% or less, 5.5% or less, 6% or less, 6.5% or less, 7% or less, 7.5% or less, 8% or less, 8.5% or less, 9% or less, or 9.5% or less) by weight, based on the total weight of the liquid product.

In some embodiments, the bio-stimulant compounds can be present in the liquid product in an amount from about 0.001% to about 20% (e.g., from 0.005% to 10%, from 0.01% to 10%, from 0.05% to 10%, from 0.1% to 10%, from 0.2% to 10%, from 0.3% to 10%, from 0.4% to 10%, from 0.5% to 10%, from 0.6% to 10%, from 0.7% to 10%, from 0.8% to 10%, from 0.9% to 10% from 1% to 10%, from 1% to 9.5%, from 1% to 9%, from 1.5% to 8.5%, from 2% to 8%, from 2.5% to 7.5%, from 3% to 7%, from 3% to 6.5%, from 3% to 6%, from 3% to 5.5%, from 3% to 5%, from 2.5% to 5%, from 2% to 5%, from 1.5% to 5%, from 1.4% to 5%, from 1.3% to 5%, from 1.2% to 5%, from 1.1% to 5%, from 1% to 5%, from 0.9% to 5%, from 0.8% to 5%, from 0.7% to 5%, from 0.6% to 5%, from 0.5% to 5%, from 0.4% to 5%, from 0.3% to 5%, from 0.2% to 5%, or from 0.1% to 5%) by weight, based on the total weight of the liquid product.

The liquid product can comprise water in an amount of about 50% or greater (e.g., 55% or greater, 60% or greater, 65% or greater, 70% or greater, 75% or greater, 80% or greater, or 85% or greater) by weight, based on the total weight of the liquid product. In some embodiments, the liquid product can comprise water in an amount of about 90% or less (e.g., 55% or less, 60% or less, 65% or less, 70% or less, 75% or less, 80% or less, or 85% or less) by weight, based on the total weight of the liquid product. In some embodiments, the liquid product can comprise water in an amount from about 50% to about 90% (e.g., from 55% to 85%, from 60% to 80%, or from 65% to 75%) by weight, based on the total weight of the liquid product.

The liquid product can also comprise lignin in an amount of about 0.01% or greater (e.g., 0.05% or greater, 0.1% or greater, 0.5% or greater, 1% or greater, 2% or greater, 3% or greater, 4% or greater, 5% or greater, 6% or greater, 7% or greater, 8% or greater, 9% or greater, 10% or greater, 15% or greater, 20% or greater, 25% or greater, 30% or greater, 35% or greater, 40% or greater, 45% or greater, 50% or greater, 55% or greater, 60% or greater, 65% or greater, or 70% or greater) by weight, based on the total weight of the liquid product.

In some embodiments, the liquid product can comprise lignin in an amount of about 75% or less (e.g., 0.05% or less, 0.1% or less, 0.5% or less, 1% or less, 2% or less, 3% or less, 4% or less, 5% or less, 6% or less, 7% or less, 8% or less, 9% or less, 10% or less, 15% or less, 20% or less, 25% or less, 30% or less, 35% or less, 40% or less, 45% or less, 50% or less, 55% or less, 60% or less, 65% or less, or 70% or less) by weight, based on the total weight of the liquid product.

In some embodiments, the liquid product can comprise lignin in an amount from about 0.01% to about 75% (e.g., from 0.05% to 75%, from 0.1% to 75%, from 0.5% to 75%, from 1% to 75%, from 2% to 75%, from 2% to 75%, from 3% to 75%, from 4% to 75%, from 5% to 75%, from 6% to 75%, from 7% to 75%, from 8% to 75%, from 9% to 75%, from 10% to 75%, from 15% to 75%, from 20% to 75%, from 25% to 75%, from 30% to 70%, from 35% to 65%, from 40% to 60%, or from 45% to 55%) by weight, based on the total weight of the liquid product.

The liquid product can also comprise various dry matter. In other words, the liquid product can have a solids content of about 0.0001% or greater (e.g., 0.0005% or greater, 0.001% or greater, 0.005% or greater, 0.01% or greater, 0.05% or greater, 0.1% or greater, 0.5% or greater, 1% or greater, 1.5% or greater, 2% or greater, 2.5% or greater, 3% or greater, 3.5% or greater, 4% or greater, 4.5% or greater, 5% or greater, 6% or greater, 7% or greater, 8% or greater, 9% or greater, 10% or greater, 11% or greater, 12% or greater, 13% or greater, 14% or greater, 15% or greater, 16% or greater, 17% or greater, 18% or greater, 19% or greater, 20% or greater, 25% or greater, 30% or greater, 35% or greater, 40% or greater, or 45% or greater) by weight, based on the total weight of the liquid product.

In some embodiments, the liquid product can have a solids content of about 50% or less (e.g., 0.0005% or less, 0.001% or less, 0.005% or less, 0.01% or less, 0.05% or less, 0.1% or less, 0.5% or less, 1% or less, 1.5% or less, 2% or less, 2.5% or less, 3% or less, 3.5% or less, 4% or less, 4.5% or less, 5% or less, 6% or less, 7% or less, 8% or less, 9% or less, 10% or less, 11% or less, 12% or less, 13% or less, 14% or less, 15% or less, 16% or less, 17% or less, 18% or less, 19% or less, 20% or less, 25% or less, 30% or less, 35% or less, 40% or less, or 45% or less) by weight, based on the total weight of the liquid product.

In some embodiments, the liquid product can have a solids content from about 0.0001% to about 50% (e.g., from 0.0005% to 50%, from 0.001% to 50%, from 0.005% to 50%, from 0.01% to 50%, from 0.05% to 50%, from 0.1% to 50%, from 0.5% to 50%, from 1% to 50%, from 0.0005% to 20%, from 0.001% to 20%, from 0.005% to 20%, from 0.01% to 20%, from 0.05% to 20%, from 0.1% to 20%, from 0.5% to 20%, from 1% to 20%, from 0.0005% to 19%, from 0.001% to 18%, from 0.005% to 17%, from 0.01% to 16%, from 0.05% to 15%, from 0.1% to 14%, from 0.5% to 13%, from 1% to 12%, from 1.5% to 11%, from 2% to 10%, from 2% to 9%, from 2% to 8%, from 2% to 7%, from 2% to 6%, from 2% to 5%, from 2.5% to 4.5%, or from 3% to 4%) by weight, based on the total weight of the liquid product.

The liquid product can also be acidic. For instance, the liquid product can have a pH of about 7 or less (e.g., 6.5 or less, 6 or less, 5.5 or less, 5 or less, 4.5 or less, 4 or less, 3.5 or less, 3 or less, 2.5 or less, 2 or less, 1.5 or less, 1 or less or 0.5 or less). In some embodiments, the liquid product can have a pH of about 0 or greater (e.g., 6.5 or greater, 6 or greater, 5.5 or greater, 5 or greater, 4.5 or greater, 4 or greater, 3.5 or greater, 3 or greater, 2.5 or greater, 2 or greater, 1.5 or greater, 1 or greater, or 0.5 or greater). In some embodiments, the liquid product can have a pH from about 0 to about 7 (e.g., from 0.5 to 6.5, from 1 to 6, from 1.5 to 5.5, from 2 to 5, from 2.5 to 4.5, from 3 to 4, from 0 to 6.5, from 0 to 6, from 0 to 5.5, from 0 to 5, from 0 to 4.5, or from 0 to 4).

Additionally, the liquid product can entrain substantially all VOCs present in the feedstock in a liquid form. In other words, the process of making the liquid product can produce substantially trace amounts of VOCs in a vapor phase because the VOCs are substantially contained in the liquid product. As used herein, the term "substantially trace amounts of VOCs" refers to producing VOCs in an amount of about 10 ppm or less.

Also disclosed herein is a method of promoting growth in a plant using the liquid products described above. The method can comprise administering a liquid product to said plant. A variety of liquid products can be formulated as described above and are contemplated and understood to be within the scope of this disclosure.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a flowchart of an exemplary process 100 of the present disclosure. As shown in block 110, additive 112 can be mixed with feedstock 114 to obtain first mixture 116. Feedstock 114 can comprise a fibrous material and water, and the fibrous material can comprise lignin and be selected from the fibrous materials of the present disclosure. Examples of additive 112 are described above, but it is to be understood that other elements can be present in additive 112, such as inhibitors, defoamers, indicators, dyes, and the like. Process 100 can then proceed to block 120 or to other steps of process 100 not shown.

Referring to feedstock 114, feedstock 114 can comprise water in an amount of about 5% or greater (e.g., 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 75% or greater, 80% or greater, 85% or greater, or 90% or greater) by weight, based on the total weight of feedstock 114. Feedstock 114 can also comprise water in an amount of about 95% or less (e.g., 10% or less, 15% or less, 20% or less, 25% or less, 30% or less, 35% or less, 40% or less, 45% or less, 50% or less, 55% or less, 60% or less, 65% or less, 70% or less, 75% or less, 80% or less, 85% or less, or 90% or less) by weight, based on the total weight of feedstock 114. Alternatively, feedstock 114 can comprise water in an amount from about 5% to about 95% (e.g., from 5% to 90%, from 10% to 90%, from 15% to 85%, from 20% to 80%, from 25% to 75%, from 30% to 70%, from 35% to 65%, from 40% to 60%, or from 45% to 55%) by weight, based on the total weight of feedstock 114.

Referring now to block 120, in block 120, first mixture 116 can be conditioned to obtain liquid product 122 and dry pulp product 124. Further steps of the conditioning of block 120 are outlined in greater detail by FIG. 3. Liquid product 122 can entrain substantially all VOCs present in feedstock 114 in a liquid form. In other words, the conditioning step of block 120 can produce a substantially undetectable amount of VOCs in a vapor phase because the VOCs are substantially contained in liquid product 122. Examples of liquid product 122 are described above, but it is to be understood that liquid product 122 can have a composition according to any embodiments of the present disclosure.

The conditioning step of block 120 can occur at a temperature requiring little to no added heat. In other words, the conditioning can substantially self-generate heat without a need for an external heat source. For example, the conditioning step of block 120 can occur at a temperature of about 350° F. or less (e.g., 340° F. or less, 330° F. or less, 320° F. or less, 310° F. or less, 300° F. or less, 290° F. or less, 280° F. or less, 270° F. or less, 260° F. or less, 250° F. or less, 240° F. or less, 230° F. or less, 220° F. or less, or 210° F. or less). The conditioning step of block 120 can also occur at a temperature of about 200° F. or greater (e.g., 340° F. or greater, 330° F. or greater, 320° F. or greater, 310° F. or greater, 300° F. or greater, 290° F. or greater, 280° F. or greater, 270° F. or greater, 260° F. or greater, 250° F. or greater, 240° F. or greater, 230° F. or greater, 220° F. or greater, or 210° F. or greater). The conditioning step of block 120 can additionally occur at a temperature from about 200° F. to about 350° F. (e.g., from 210° F. to 340° F., from 220° F. to 330° F., from 230° F. to 320° F., from 240° F. to 310° F., from 250° F. to 300° F., from 200° F. to 300° F., from 210° F. to 290° F., from 220° F. to 280° F., from 230° F. to 270° F., or from 240° F. to 260° F.).

Dry pulp product 124 can comprise a fibrous material and water, and the fibrous material can be substantially similar to the fibrous material of feedstock 114. Dry pulp product 124 can also be substantially dewatered. For example, dry pulp product 124 can comprise water in an amount of about 35% or less (e.g., 30% or less, 25% or less, 20% or less, 15% or less, 10% or less, 5% or less, 4% or less, 3% or less, 2% or less, or 1% or less) by weight, based on the total weight of dry pulp product 124. Dry pulp product 124 can also comprise water in an amount of about 0.5% or greater (e.g., 30% or greater, 25% or greater, 20% or greater, 15% or greater, 10% or greater, 5% or greater, 4% or greater, 3% or greater, 2% or greater, or 1% or greater) by weight, based on the total weight of dry pulp product 124. Dry pulp product 124 can alternatively comprise water in an amount from about 0.5% to about 35% (e.g., from 0.5% to 30%, from 1% to 25%, from 2% to 20%, from 3% to 15%, from 4% to 10%, from 5% to 10%, from 5% to 15%, from 5% to 20%, from 5% to 25%, from 5% to 30%, from 10% to 30%, from 15% to 30%, or from 20% to 30%) by weight, based on the total weight of dry pulp product 124. Process 100 can terminate after block 120, or process 100 can then proceed to block 130. Process 100 can additionally proceed to other steps of process 100 not shown.

Figure 4A:
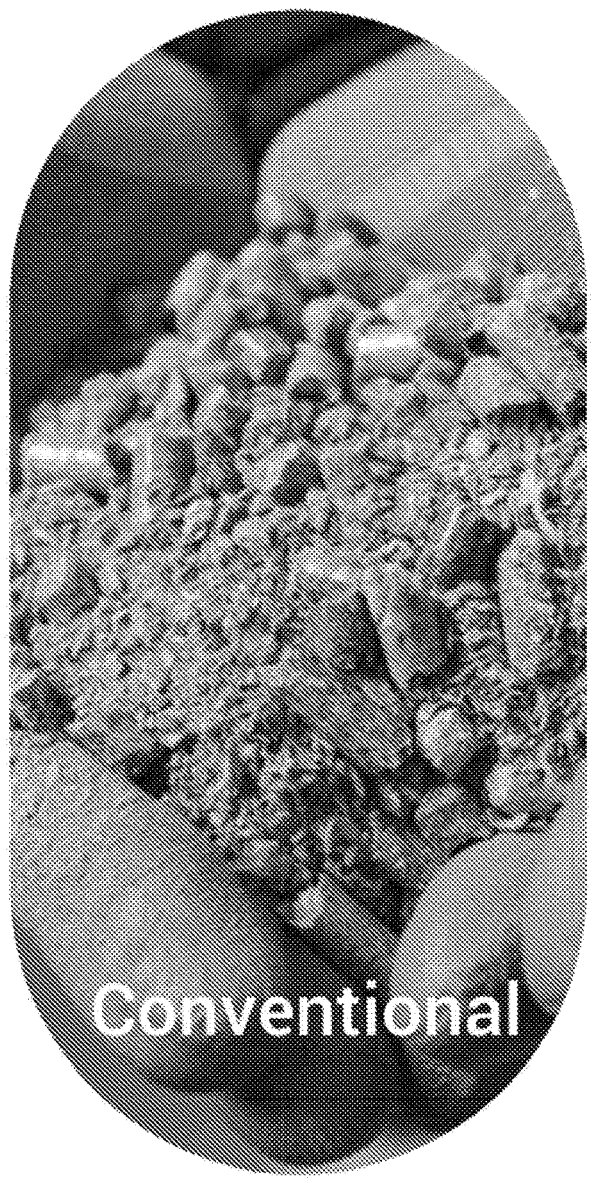
FIG. 4A is a photograph of a fibrous pellet produced from a conventional process.
Figure 4B:
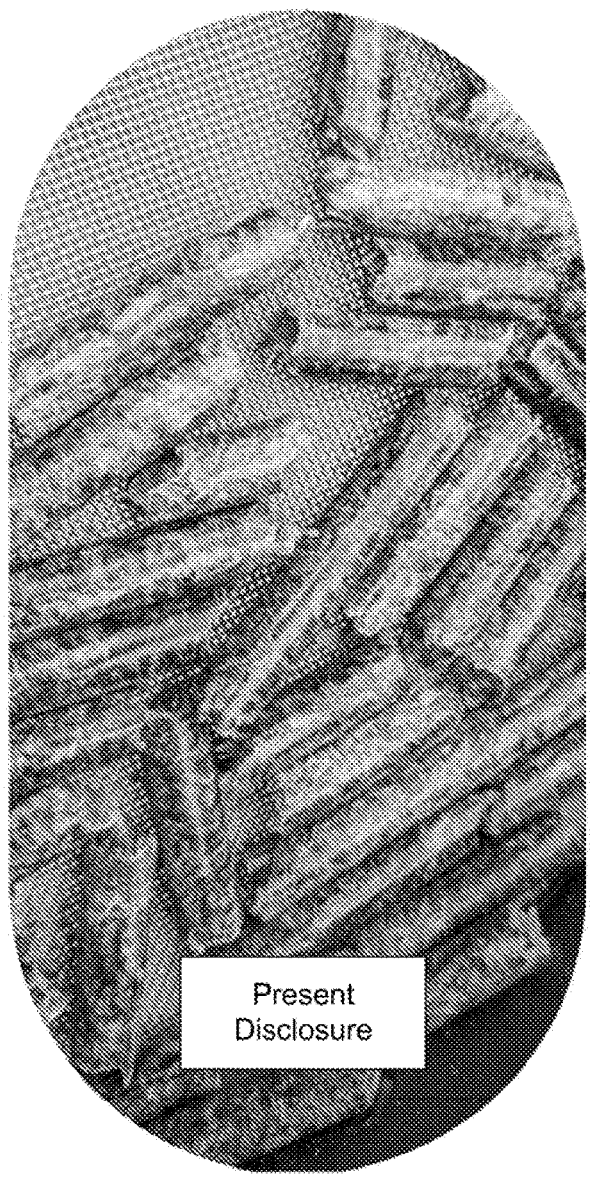
FIG. 4B is a photograph of a fibrous pellet produced from a process according to some embodiments of the present disclosure.

In block 130, dry pulp product 124 can be further processed into useful products. For example, dry pulp product 124 can be pelletized to form a fibrous pellet. Examples of a fibrous pellet are described above, but it is to be understood that the fibrous pellet can have a composition according to any embodiments of the present disclosure. A fibrous pellet manufactured from the presently disclosed technology is shown in FIG. 4B, compared with a fibrous pellet produced from a conventional process, shown in FIG. 4A. Additionally, a scanning electron microscope (SEM) image of a fibrous pellet produced by a conventional process is shown in FIG. 5A compared to a SEM image of a fibrous pellet produced by processes of the present disclosure shown in FIG. 5B. Alternatively, dry pulp product 124 can be ground into fine particulates. The fine particulates can be used in packaging material, fiber boards, paper boards, and the like. Dry pulp product 124 can also be used for paper making or to produce other lignocellulosic-based products. Dry pulp product 124 can also be used as a binder fiber to improve the mechanical properties of other fibrous materials. Process 100 can terminate and complete after block 130. However, in other embodiments, process 100 can continue on to other process steps not shown.

Figure 2:
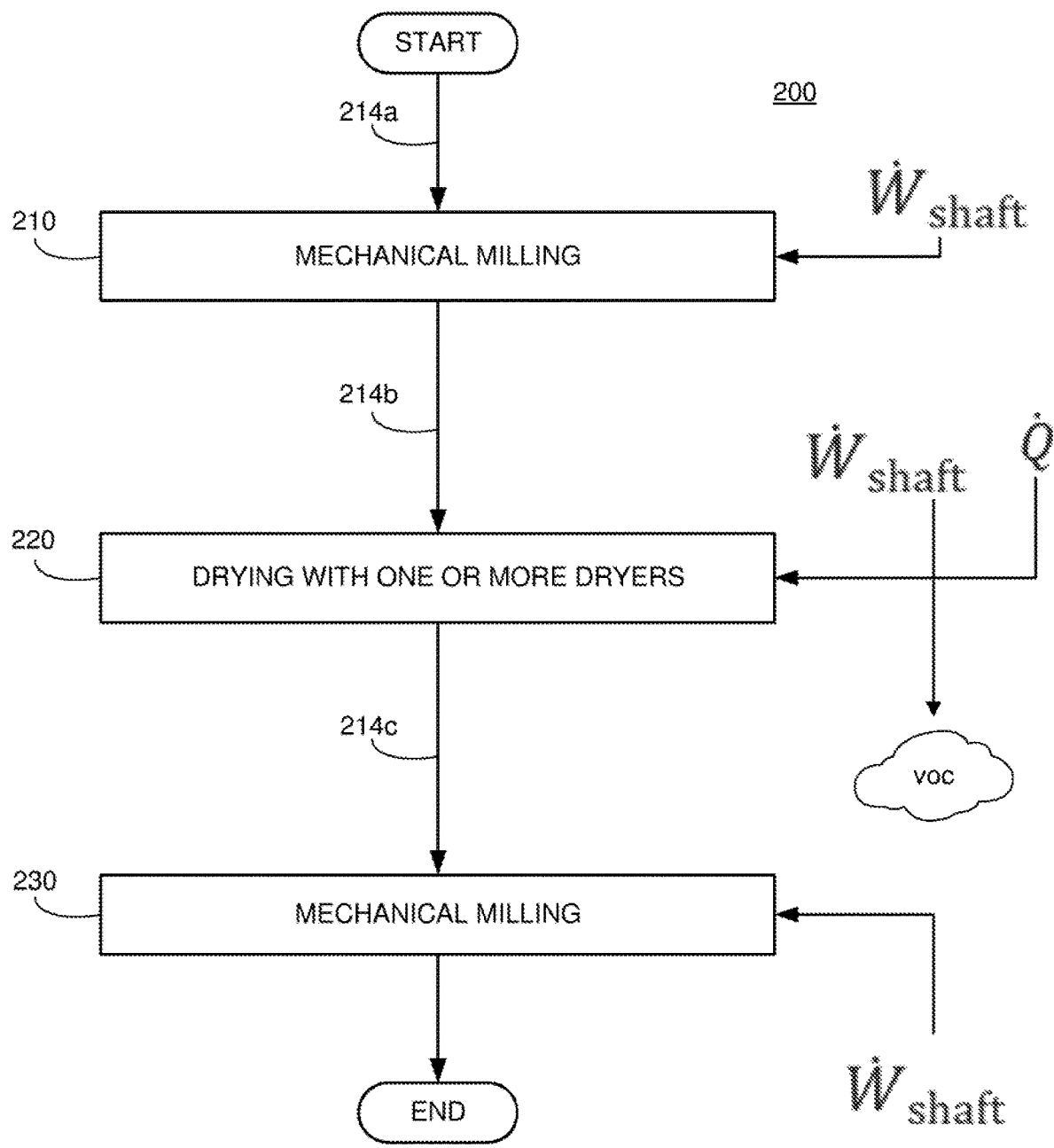
FIG. 2 illustrates a traditional process for processing fibrous material for comparison with processes of the present disclosure.

FIG. 2 illustrates a flowchart of a traditional process 200. As shown in block 210, feedstock 214a can undergo a mechanical milling process. The mechanical milling process also requires a first amount of shaft work to complete. The work required for block 210 traditionally is time consuming and expensive, resulting in an inefficient process. The equipment needed for the mechanical milling process is expensive as well and is complicated and difficult to keep maintained. Therefore, block 210 of traditional process 200 is undesirable. Traditional process 200 can then proceed to block 220.

In block 220, the milled feedstock 214b can be dried by one or more dryers to obtain dry feedstock 214c. The one or more dryers require additional shaft work to move milled feedstock 214b through the dryers, and the one or more dryers also require added heat to raise the temperature of milled feedstock 214b. The energy required to heat the one or more dryers, typically to evaporate water, is extremely high and prohibitively cost-intensive. Additionally, the high temperatures used to dry milled feedstock 214b result in the release of several VOCs. The VOCs must then either be further treated, requiring additional expensive equipment and energy requirements; or the VOCs are simply released to the atmosphere, causing harmful environmental effects. Therefore, block 220 of traditional process 200 is undesirable. Traditional process 200 can then proceed to block 230.

In block 230, dry feedstock 214c can undergo a mechanical milling process to obtain a dry pulp product 234. This mechanical milling process also requires a second amount of shaft work to complete, as in block 210. The work required for block 230 traditionally is time consuming and expensive, resulting in an inefficient process. The equipment needed for the mechanical milling process is expensive as well and is complicated and difficult to keep maintained. Furthermore, the mechanical milling process cannot fully pulp, or comminute, dry feedstock 214c. The fibers must be ground up, reducing the overall strength; or left in-tact, increasing clumping and decreasing uniformity. Therefore, block 230 of traditional process 200 is undesirable. Traditional process 200 can terminate and complete after block 230. However, in other embodiments, traditional process 200 can continue on to other process steps not shown.

In contrast to traditional process 200, the processes of the present disclosure, such as process 100 in FIG. 1, need very little additional shaft work and little to no added heat. The processes of the present disclosure can additionally substantially entrain all VOCs in the liquid form of the liquid product, as described above, reducing the overall environmental impact. Additionally, due to having little added heat, the fibers in the fibrous material can undergo less homification during processes of the present disclosure. This results in mechanically superior fibers that are far more compressible than fibers produced from traditional processes. Therefore, processes of the present disclosure are more cost-effective, energy-efficient, and environmentally friendly than traditional processes used to accomplish the same goals.

Figure 3A:
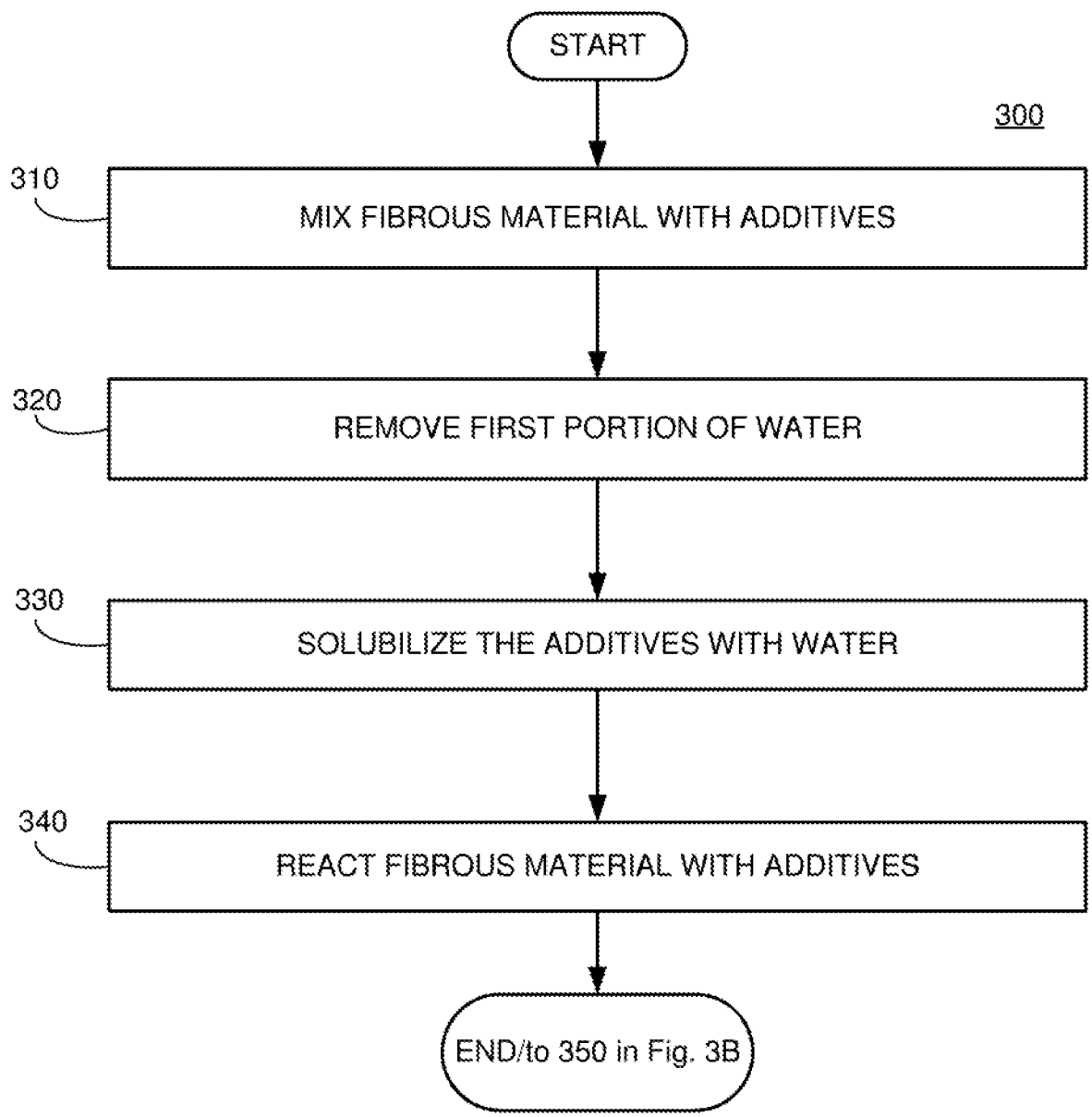
FIG. 3A illustrates an exemplary conditioning process according to some embodiments of the present disclosure.

FIG. 3a illustrates a flowchart of an exemplary conditioning process 300 of the present disclosure. As would be appreciated, conditioning process 300 can occur substantially during block 120 of FIG. 1. As shown, in block 310, the fibrous material (i.e., in first mixture 116) can substantially interact with the additive. This interaction can form a substantially treated material between the additive and the fibrous material. Without wishing to be bound by any scientific theory, the additive can interact with the lignin in the fibrous material to decrease the rigidity of the lignocellulosic cells and increase the plasticity of the lignin. Conditioning process 300 can then proceed to block 320 or to other steps of conditioning process 300 not shown.

In block 320, a first portion of water in the fibrous material (i.e., the treated material from block 310) can be liberated. Without wishing to be bound by any scientific theory, the additive can have a dewatering or drag reducing effect on the fibrous material to liberate a first amount of free water from the fibrous material. This effect increases the amount of water removed by conditioning process 300 can reduces the need for additional drying steps. Conditioning process 300 can then proceed to block 330 or to other steps of conditioning process 300 not shown.

In block 330, the fibrous material (i.e., in the treated material) can be infused with the additive. Without wishing to be bound by any scientific theory, the liberated first portion of water can solubilize the additive, allowing the additive to infuse into the fibrous material. Conditioning process 300 can then proceed to block 340 or to other steps of conditioning process 300 not shown.

In block 340, the fibrous material can interact with the infused additive to weaken the lignin in the fibrous material. As described above in block 310, without wishing to be bound by any scientific theory, the additive can interact with the lignin in the fibrous material to decrease the rigidity of the lignocellulosic cells and increase the plasticity of the lignin. The infusing of block 330 can further increase the interaction and can homogenize the treated material further in block 340. Conditioning process 300 can then proceed to block 350 as shown in FIG. 3b, proceed to other steps of conditioning process 300 not shown, or terminate after block 340.

Figure 3B:
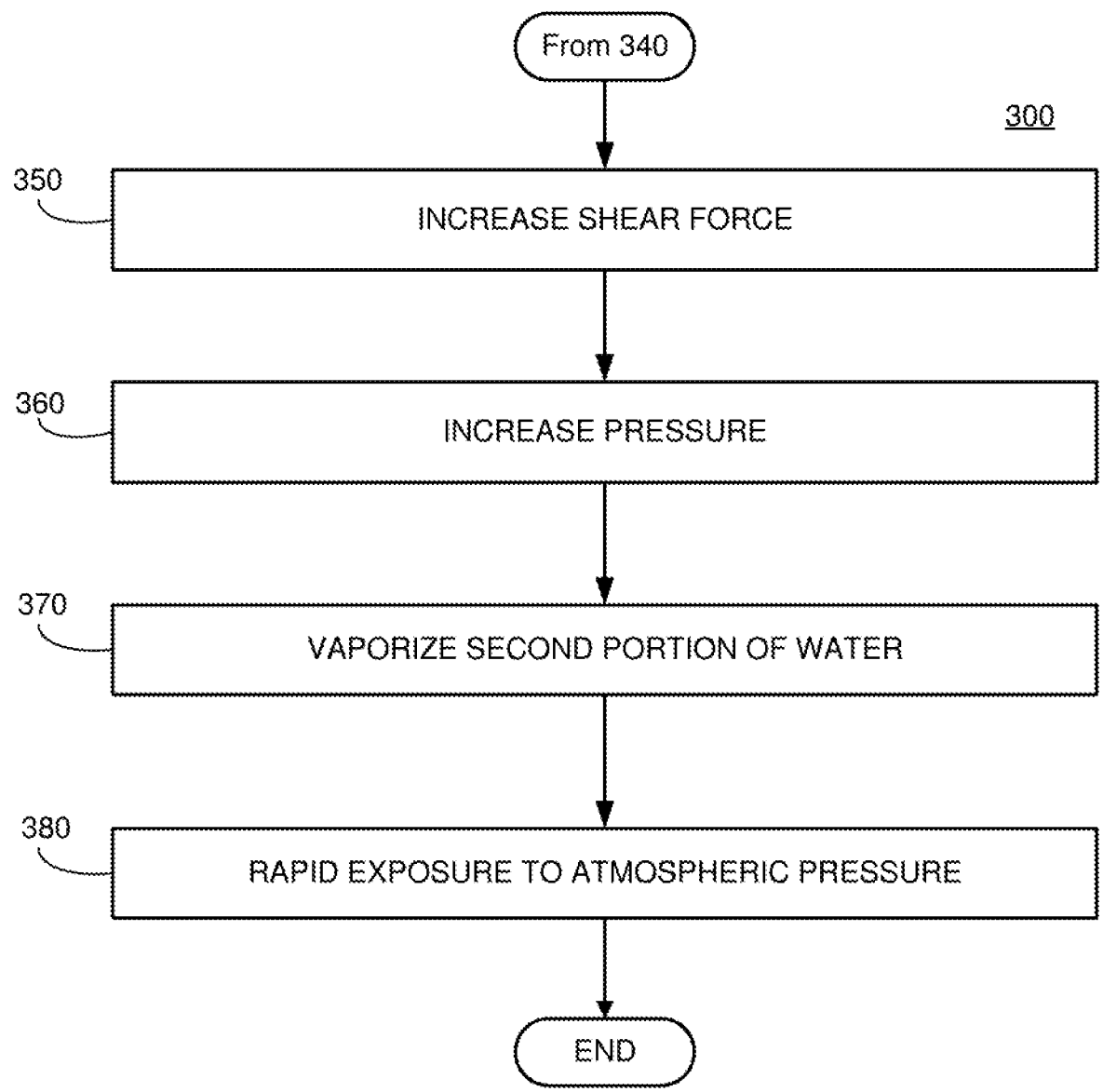
FIG. 3B illustrates an exemplary conditioning process according to some embodiments of the present disclosure.

FIG. 3b illustrates a flowchart of an exemplary conditioning process 300 of the present disclosure. Systems and machines for implementing the same can be found described in greater detail in FIG. 4. As shown, in block 350, a pressure gradient can be applied to the fibrous material. This pressure increase can cause a temperature of the material to increase. Without wishing to be bound by any scientific theory, the drag-reducing properties of the additive can increase the frictional forces on the fibrous material. Because the lignin in the fibrous material has decreased rigidity and increased plasticity due to the additive, the lignin (and therefore the fibrous material) can remain intact without breaking as the temperature increases. Conditioning process 300 can then proceed to block 360 or to other steps of conditioning process 300 not shown.

In block 360, a shear force can be applied to the fibrous material. The applied shear force can increase the frictional forces acting on the fibrous material, further increasing the internal temperature of the fibrous material. Because the lignin in the fibrous material has decreased rigidity and increased plasticity due to the additive, the lignin (and therefore the fibrous material) can remain intact without breaking as the temperature increases. Conditioning process 300 can then proceed to block 370 or to other steps of conditioning process 300 not shown. It should be understood that the pressure gradient step of block 350 and the shear force step of block 360 can occur in any order or can be concurrent with one another.

In block 370, a second portion of water in the fibrous material (i.e., the treated material) can be vaporized by fractionating the fibrous material. As would be appreciated, the shear and frictional forces can fractionate the fibrous material, releasing additional free water. The temperature increase due to the shear force and pressure gradient can also vaporize the free water as it is released. Without wishing to be bound by any scientific theory, the lignin in the cell walls of the fibrous material, having been plasticized by the additive, can now "balloon" under pressure. In other words, as water contained inside of the individual cells of the fibrous material begins to vaporize due to the temperature increases of the pressure gradient and shear/frictional forces, the plasticized lignin in the cell walls can expand without rupturing, as in a balloon being filled with hot air. As volumes of cells increase under frictional and shear forces, and increased temperatures and pressures, the cells can remain intact while the fibrous material can further fractionate. Conditioning process 300 can then proceed to block 380 or to other steps of conditioning process 300 not shown.

In block 380, the fibrous material (i.e., in the treated material) can be exposed to atmospheric pressure rapidly. Without wishing to be bound by any scientific theory, this rapid depressurization of the fibrous material can cause the chemo-mechanical cellular explosion of the fibrous material. In other words, the "ballooned" cells in the fibrous material can now fully rupture, releasing intracellular water and further fractionating the fibrous material. As would be appreciated, the fibrous material can undergo immense stress during conditioning due to the increased pressure gradient, shear force, frictional force, and temperature to result in expanded cells containing vaporized water. The cells can expand due to the interaction of the lignin with the additive, without wishing to be bound by any scientific theory. The rapid return to atmospheric conditions of the fibrous material can induce the chemo-mechanical cellular explosion process to release a final portion of water and obtain dry pulp product 124. It will also be appreciated that the liberated portions of water during conditioning process 300 can contain other components and can be recovered as liquid product 122. Conditioning process 300 can then terminate after block 380 or can proceed to other steps of conditioning process 300 not shown.

Figure 6:
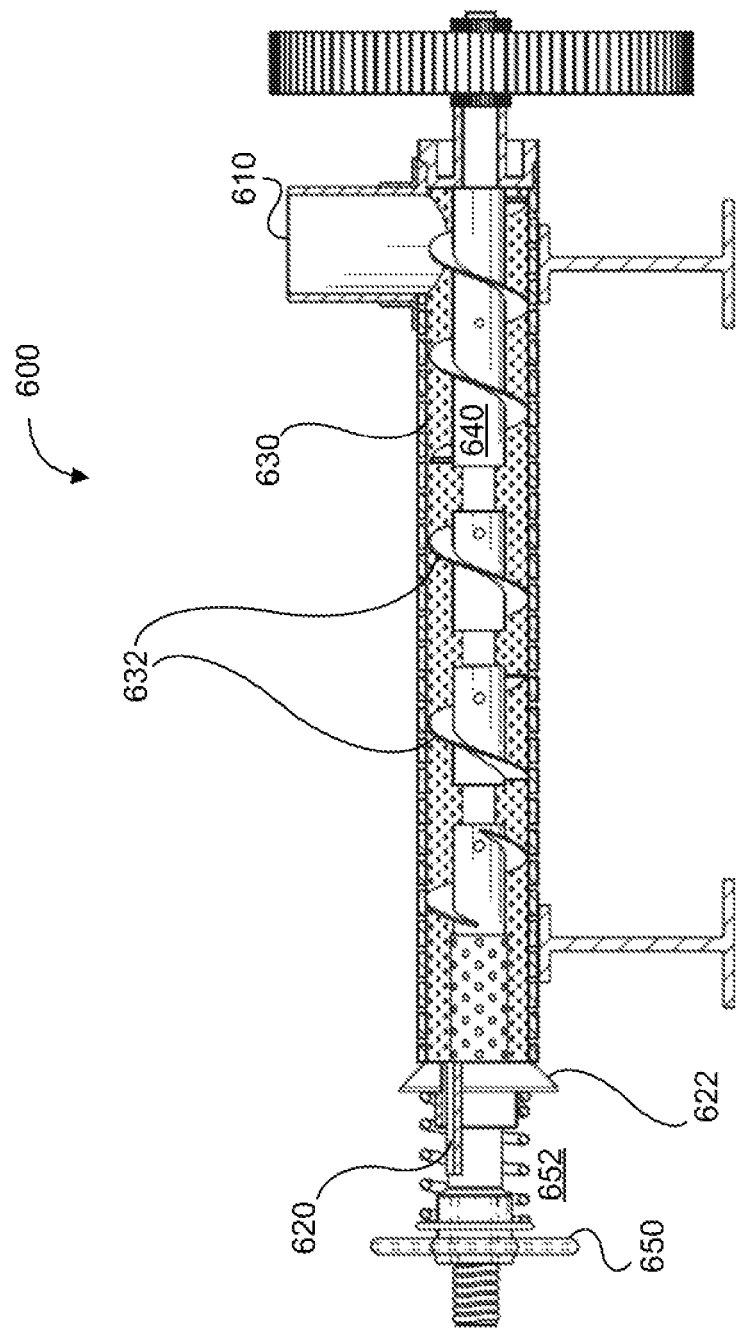
FIG. 6 illustrates a machine used for some processes according to some embodiments of the present disclosure.

Disclosed herein is a machine 600 that can be used in the processes described herein. For example, a machine 600 for chemo-mechanical cellular explosion can be provided, as shown in FIG. 6. Machine 600 can include an inlet 610, and the feedstock can enter machine 600 via inlet 610. The machine can include an outlet 620. The machine can include an interior chamber 630 connecting the inlet and the outlet, interior chamber 630 having an inner surface. The machine can include a shaft 640 spanning inlet 610, outlet 620, and interior chamber 630, shaft 640 having a plurality of threads disposed circumferentially around shaft 640, the plurality of threads having a first section and a second section. The first section of threads can have a first pitch and the second section of threads can have a second pitch different than the first pitch. For example, the first pitch can be greater than the second pitch.

Interior chamber 630 can further include one or more shearing members 632 disposed on the inner surface and corresponding to the second section of threads. For instance, the one or more shearing members 632 can include knife shears. Other forms of shearing members can be used in place of knife shears. The knife shears can be prepared at any height, length, or angle desired to achieve a shearing force between one or more shearing members 632 and the plurality of threads.

The shaft can be configured to rotate around a longitudinal axis shared with interior chamber 630, and the rotation can apply a shear force between the second section of threads and the one or more shearing members 632.

The machine can further include a protective shield 650 extending from an outer surface of machine 600 and substantially surrounding outlet 620, protective shield 650 having an interior space 652 between protective shield 650 and outlet 620. Machine 600 can also include an outlet gate 622 configured to control the size of the outlet. Outlet gate 622 can be configured to expand and/or contract to control the flow rate of material through machine 600.

As discussed, the feedstock can enter machine 600 via inlet 610. The feedstock can be mixed with the additive before progressing through machine 600 to weaken the cell walls of the fibrous material in the feedstock. When inside interior chamber 630, the feedstock can then begin undergoing a shear force from the rotation of shaft 640 in contact with shearing members 632. As the shear force begins acting on the fibrous material in the feedstock, the frictional forces fractionating the fibrous material can cause the internal pressure and temperature to begin to rise. As the material continues to move through interior chamber 630 and undergo shearing due to shearing members 632, water can be removed from the feedstock as the temperature and pressure continues to rise. The weakened cell walls can begin to balloon due to the increased temperature and pressure. The fibrous material can then pass through outlet 620 can outlet gate 622 controlling the rate of exit of the fibrous material. The fibrous material can be rapidly exposed to atmospheric pressure upon exiting outlet 620, thus inducing a cellular explosion.

Also disclosed herein is a process for increasing feedstock throughput according to the present disclosure. One or more additives can be mixed with a feedstock to obtain a first mixture. The feedstock can comprise a fibrous material and water, and the fibrous material can comprise lignin. Suitable examples of a fibrous material and additives are described above, however, other examples can be used. Suitable examples of water content in a feedstock are also described above. The feedstock can be densified to form a product. The product can be in the form of pellets, briquettes, bales, logs, and the like. As would be appreciated, the product can have bulk density properties and PDI substantially similar to the fibrous pellets discussed above, because the fibrous pellets and the product are produced using similar processes. The throughput of the process can increase from 1% to 60% (e.g., 1% to 30%) relative to the throughput of the process with no additive. Without wishing to be bound by any scientific theory, the additive can act as a drag reducing agent to increase the throughput of the densifying step to increase the rate of product produced. Such an embodiment can be used to increase, for example, animal feed rate of production.

Examples

The following examples are provided by way of illustration but not by way of limitation.

Over a period of one hour, 800 pounds of wood chips from loblolly pine having an initial moisture content of 50% were conditioned by processes of the present disclosure to a moisture content of 18%. 48 kW in added energy was used in the process. As it was conveyed, the produced fiber then air-dried to 16% moisture content. It was milled to produce pellets having a pellet durability index of 99, a moisture content of 4%, and a bulk density of 750 kg/m$^3$. When submersed in water for two minutes, the pellets exhibited very limited degradation. Steam was not injected during the conditioning process. Additional thermal energy was not added during pelletizing. A liquid extract was also produced from the conditioning that contained the following components outlined in Table I.

TABLE I

Liquid Product Composition Example

| Component | Percent Weight (liquid basis) |
| --- | --- |
| Humic Acid | 0.19-0.46% |
| Fulvic Acid | 0.82-0.89% |
| Kjeldahl Protein | 0.43% |
| Moisture & Volatile Matter | 98.7% |
| Fiber | 0.5% |
| Calcium (AOAC 2011.14) | 148 ppm |
| Phosphorus (AOAC 2011.14) | 40.1 ppm |
| Sodium (AOAC 2011.14) | 210 ppm |
| Potassium (AOAC 2011.14) | 553.3 ppm |
| Magnesium (AOAC 2011.14) | 34.5 ppm |
| Manganese (AOAC 2011.14) | 13 ppm |
| Copper (AOAC 2011.14) | <10 ppm |
| Zinc (AOAC 2011.14) | 5.2 ppm |
| Hydroxyproline | 0.01% |
| Aspartic Acid | 0.01% |
| Glutamic Acid | 0.01% |
| Glycine | 0.01% |
| Alanine | 0.01% |
| Cysteine | 0.01% |
| Leucine | 0.01% |
| Tyrosine | 0.01% |
| Lysine | 0.01% |
| Tryptophan | <0.02% |

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the various patent offices and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A chemo-mechanical cellular explosion process, comprising:
    mixing one or more additives to a fibrous material, the fibrous material comprising water;
    removing a first portion of water from the fibrous material;
    solubilizing the one or more additives with the first portion of water;
    weakening cell walls of a plurality of cells of the fibrous material;
    applying a shear force to the fibrous material to increase a pressure and a temperature of the fibrous material;
    vaporizing a second portion of water in the fibrous material by fractionating the fibrous material; and
    exposing the fibrous material to atmospheric pressure to induce exploding of the plurality of cells in the fibrous material to obtain a liquid product and a dry pulp product,
    wherein applying the shear force to the fibrous material to increase a pressure and a temperature of the fibrous material occurs in a chamber and comprises rotating a shaft in the chamber, the shaft having one or more threads disposed circumferentially around the shaft, wherein heat from an external source is not injected into the chamber when the shear force is applied.

2. The process of claim 1, wherein the fibrous material further comprises lignin and hemicellulose.

3. The process of claim 1, wherein the dry pulp product comprises water in an amount of about 35% or less by weight, based on the total weight of the dry pulp product.

4. The process of claim 1, wherein the liquid product comprises water in an amount of about 50% or greater by weight, based on the total weight of the liquid product.

5. The process of claim 1, further comprising pelletizing the dry pulp product to form a pellet.

6. The process of claim 1, wherein the liquid product comprises one or more bio-stimulant compounds and water.

7. The process of claim 6, wherein the one or more bio-stimulant compounds comprise one or more of: minerals, proteins, amino acids, humic acid, fulvic acid, and one or more organic acids.

8. The process of claim 7, wherein the minerals comprise one or more of potassium, phosphor, phosphorus, nitrous compounds, calcium, magnesium, sulfur, sulfurous, sodium, iron, manganese, zinc, and copper.

9. The process of claim 6, wherein the liquid product further comprises one or more of: cellulose, lignin, and hemicellulose.

10. The process of claim 1, wherein when the fibrous material is mixed with the one or more additives, the fibrous material comprises water in an amount from about 5% to about 90% by weight, based on the total weight of the fibrous material.

11. The process of claim 1, wherein when the fibrous material is exposed to atmospheric pressure to induce exploding of the plurality of cells, the fibrous material comprises water in an amount of about 35% or less by weight, based on the total weight of the fibrous material.

12. The process of claim 1, wherein the process occurs at a maximum temperature from about 200° F. to about 350° F.

13. The process of claim 1, wherein the additive comprises a surfactant.

14. The process of claim 1, wherein the additive has a molecular weight from about 30 g/mol to about 10,000,000 g/mol.

15. The process of claim 1, wherein the dry pulp product comprises water in an amount ranging from about 5% to about 25% by weight, based on the total weight of the dry pulp product, without additional processing.

* * * * *